United States Patent
Puleri et al.

(10) Patent No.: US 11,183,757 B2
(45) Date of Patent: Nov. 23, 2021

(54) TRANSMITTING AND RECEIVING APPARATUSES AND METHODS FOR A PHASED ARRAY ANTENNA

(71) Applicant: Telefonaktiebolaget LM Ericsson (publ), Stockholm (SE)

(72) Inventors: Marzio Puleri, Pisa (IT); Antonella Bogoni, Pisa (IT); Antonio D'Errico, Pisa (IT); Paolo Ghelfi, Pisa (IT); Patryk Urban, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 328 days.

(21) Appl. No.: 16/067,440

(22) PCT Filed: Jan. 6, 2016

(86) PCT No.: PCT/EP2016/050141
§ 371 (c)(1),
(2) Date: Jun. 29, 2018

(87) PCT Pub. No.: WO2017/118480
PCT Pub. Date: Jul. 13, 2017

(65) Prior Publication Data
US 2019/0020109 A1   Jan. 17, 2019

(51) Int. Cl.
*H01Q 3/26* (2006.01)
*H04B 10/2575* (2013.01)

(52) U.S. Cl.
CPC ......... *H01Q 3/2676* (2013.01); *H01Q 3/2682* (2013.01); *H04B 10/25752* (2013.01)

(58) Field of Classification Search
CPC .......................... H01Q 3/2676; H01Q 3/2682
See application file for complete search history.

(56) References Cited

U.S. PATENT DOCUMENTS 5,751,248 A   5/1998   Thaniyavarn
5,977,911 A   11/1999  Green et al.
(Continued)

FOREIGN PATENT DOCUMENTS

WO   WO-2009121967 A1 * 10/2009 ........... H01Q 3/2676

OTHER PUBLICATIONS

Wei et al. "Optical True Time Delay for Two-Dimensional Phased Array Antennas Using Compact Fiber Grating Prism." Chin. Opt. Lett. 11, 100606-(2013). pp. 1-16. (Year: 2013).*

(Continued)

*Primary Examiner* — Gregory C. Issing
(74) *Attorney, Agent, or Firm* — Baker Botts, LLP

(57) ABSTRACT

Transmitting and receiving apparatuses, transmitting and receiving methods, and a transceiver for a phased array antenna are provided. The transmitting apparatus may comprise a laser light source configured to provide an optical beam comprising one or more spectral components. The transmitting apparatus may comprise a modulator configured to modulate the optical beam with a signal to be transmitted. The transmitting apparatus may comprise one or more group delay controlling units configured to add one or more controllable time delays to the one or more spectral components. Further, the transmitting apparatus may comprise a plurality of waveguides each having a chromatic dispersion configured to guide the optical beam, wherein the laser light source is tunable to control time delays added by the plurality of waveguides.

17 Claims, 9 Drawing Sheets

(56) References Cited

U.S. PATENT DOCUMENTS

| | | | | |
|---|---|---|---|---|
| 6,320,539 | B1* | 11/2001 | Matthews | H01Q 3/2676 342/375 |
| 6,337,660 | B1 | 1/2002 | Esman et al. | |
| 6,426,721 | B1* | 7/2002 | Obara | H01Q 3/2676 342/372 |
| 6,731,829 | B2* | 5/2004 | Ionov | H04B 10/11 385/15 |
| 6,807,343 | B2* | 10/2004 | Tulchinsky | H01Q 3/2676 385/140 |
| 7,084,811 | B1 | 8/2006 | Yap | |
| 7,676,120 | B2* | 3/2010 | Chiaretti | G02F 1/0147 385/3 |
| 8,779,977 | B2* | 7/2014 | Zhou | H01Q 3/2676 342/368 |
| 2007/0206958 | A1 | 9/2007 | Chen et al. | |

OTHER PUBLICATIONS

Jiang et al. "Delay Time Enhanced Photonic Crystal Fiber Array for Wireless Communication Using 2-DX-band Phased Array Antennas." Optical Engineering, vol. 44, No. 12, Dec. 2005. pp. 1-16. (Year: 2005).*

Jung et al. "A Two-Dimensional Optical True Time Delay Beamformer Consisting of a Fiber Bragg Grating Prism and Switch-Based Fiber-Optic Delay Lines". IEEE Photonics Technology Letters, vol. 21, No. 10. May 15, 2009. (Year: 2009).*

Thai et al. "Photonic 2-D Beamformer Using Multi-Channel Chirped Fiber Grating and Optical Delay Lines with Multiple Beams Capability." 2009 Asia Pacific Microwave Conference, Singapore, 2009, pp. 206-209. (Year: 2009).*

Tong et al. "Multiwavelength Optically Controlled Phased-Array Antennas." IEEE Transactions on Microwave Theory and Techniques, vol. 46, No. 1. Jan. 1998. pp. 108-115. (Year: 1998).*

Subbaraman et al "Photonic Crystal Fiber-Based True-Time-Delay Beamformer for Multiple RF Beam Transmission and Reception of an X-Band Phased-Array Antenna," J. Lightwave Technol. 26, 2803-2809 (2008). (Year: 2008).*

Piqueras et al., "Optically beamformed beam-switched adaptive antennas for fixed and mobile broad-band wireless access networks," in IEEE Transactions on Microwave Theory and Techniques, vol. 54, No. 2, pp. 887-899, Feb. 2006. (Year: 2006).*

Lachance, Richard L. et al "Fiber Bragg gratings and chromatic dispersion", Proc. SPIE 4833, Applications of Photonic Technology 5, (Feb. 17, 2003) (Year: 2003).*

Jung et al. "A Two_Dimensional Optical True Time-Delay Beamformer Consisting of a Fiber Bragg Grating Prism and Switch-Based Fiber Optic Delay Lines." IEEE Photonics Technology Letters, vol. 21, No. 10. May 15, 2009. pp. 627-629. (Year: 2009).*

A 32-Element 8-Bit Photonic True-Time-Delay System Based On a 288 x 288 3-D MEMS Optical Switch by Volkan Kaman et al.; IEEE Photonics Technology Letters, vol. 15, No. 6—Jun. 2003.

Demonstration of a Continuously Variable True-Time Delay Beamformer Using a Multichannel CHRPED Fiber Grating by David B. Hunter et al.; IEEE Transactions on Microwave Theory and Techniques, vol. 54, No. 2—Feb. 2006.

Dispersion-Enhanced Photonic Crystal Fiber Array for a True Time-Delay Structured X-Band Phased Array Antenna by Yongqiang Jiang et al.; IEEE Photonics Technology Letters, vol. 17, No. 1—Jan. 2005.

Fast Optical Beamforming Architectures for Satellite-Based Applications (Research Article) by B. Vidal at al.; Hindawi Publishing Corporation; Advances in Optical Technologies, vol. 2012, Article ID 385409—2012.

Novel Ring Resonator-Based Integrated Photonic Beamformer for Broadband Phased Array Receive Antennas—Part II: Experimental Prototype by Leimeng Zhuang et al.; Journal of Lightwave Technology, vol. 28, No. 1—Jan. 1, 2010.

Photonic Beamforming Based On Programmable Phase Shifters With Amplitude and Phase Control by Xiaoke Yi et al.; IEEE Photonics Technology Letters, vol. 23, No. 18—Sep. 15, 2011.

International Search Report for International application No. PCT/EP2016/050141—dated Sep. 14, 2016.

Tailoring the Dispersion Behavior of Silicon Nanophtonic Slot Waveguides by Sara Mas et al.; Optics Express, vol. 18, No. 20—Sep. 27, 2010.

Triquint, 6-18 GHz 6-Bit Digital Phase Shifter (+Vc), TGP2015-SM—2013.

* cited by examiner

TRANSMITTING AND RECEIVING APPARATUSES AND METHODS FOR A PHASED ARRAY ANTENNA

PRIORITY

This nonprovisional application is a U.S. National Stage Filing under 35 U.S.C. § 371 of International Patent Application Serial No. PCT/EP2016/050141 fled Jan. 6, 2016 and entitled "Transmitting and Receiving Apparatuses and Methods for a Phased Array Antenna" which is hereby incorporated by reference in its entirety.

TECHNICAL FIELD

Aspects of the present disclosure relate to transmitting and receiving apparatuses for a phased array antenna, transmitting and receiving methods for a phased array antenna, and a transceiver for a phased array antenna, and more particularly, to transmitting and receiving apparatuses for a two dimensional phased array antenna, transmitting and receiving methods for a two dimensional phased array antenna, and a transceiver for a two dimensional phased array antenna.

BACKGROUND

Currently, the spectrum allocated for mobile communications corresponds to the Ultra-High Frequencies (UHF) band in the 300 MHz-3 GHz frequency range. This spectrum may in the future not be able to host all the traffic generated inside the mobile networks. Spectrum in the millimeter-wave band (MMB), a portion of the radiofrequency (RF) spectrum ranging from 3 GHz to 300 GHz, is at present underutilized.

In future mobile networks in the MMB, phased array antennas (PAAs) may allow steering of transmitted Radio Frequency (RF) beam using beam forming techniques, in order to improve a transmission distance of a RF beam.

One beam forming technique is an optical beam forming technique based on photonics. It is known that the optical beam forming technique uses electronic phase shifters at each antenna element to control the transmission or receiving (i.e. viewing) angle of the array. For broadband signals, this approach suffers from the squint phenomenon, which causes different frequencies of the RF signal spectrum to aim at a different angle. As is also known, squint can be avoided if the phase shifters are substituted by true-time delays (TTDs).

At present, the most developed solution for true-time delays controls a phased array antenna using controllable group delays. In conventional true-time delay techniques, antenna elements of a phased array antenna are controlled by only group delays to implement steering of a Radio Frequency (RF) signal. In such a solution, for each antenna element of the phased array antenna, a set of micro-ring resonators are required to control a time delay of a signal at the antenna element. In the future, the number of antenna elements of a phased array antenna will increase significantly so as to meet the requirements of communications. However, the number of micro-ring resonators increases linearly with the dimensions of the phased array antenna, which requires more complex calculation and thus stronger processing capability and higher power consumption.

SUMMARY

It is an object of the present disclosure to propose a transmitting apparatus and method, a receiving apparatus and method, and a transceiver to alleviate the above mentioned problems.

According to a first aspect of the present disclosure, an apparatus for a phased array antenna configured to transmit a signal is provided. The apparatus comprising a laser light source configured to provide an optical beam comprising one or more spectral components, and a modulator configured to modulate the optical beam with the signal to be transmitted. The apparatus further comprises a first type of control mechanism to control a delay of the signal to be transmitted using the one or more spectral components, and a second type of control mechanism to control a delay of the signal to be transmitted using the one or more spectral components. The apparatus is configured such that a beam-forming of the signal to be transmitted is controllable by the first and second type of control mechanism.

According to a second aspect of the present disclosure, an apparatus for a phased array antenna configured to receive a signal is provided. The apparatus comprising a laser light source configured to provide an optical beam comprising one or more spectral components; and a plurality of modulators configured to modulate the optical beam with the signal received from the phased array antenna. The apparatus comprises a first type of control mechanism to control a delay of the received signal using the one or more spectral components, and a second type of control mechanism to control a delay of the received signal using the one or more spectral components. The apparatus is configured such that a beamforming of the received signal is controllable by the first and second type of control mechanism.

According to a third aspect of the present disclosure, a transceiver is provided. The transceiver may comprise the transmitting apparatus of any example and the receiving apparatus of any example.

According to a fourth aspect of the present disclosure, a transmitting method for a phased array antenna is provided. A method of transmitting a signal for a phased array antenna comprises providing a laser light source configured to provide an optical beam comprising one or more spectral components; and modulating the optical beam with the signal to be transmitted. The method further comprises controlling a delay of the signal to be transmitted using a first type of control mechanism on the one or more spectral components, and controlling a delay of the signal to be transmitted using a second type of control mechanism on the one or more spectral components. The method further comprises controlling beamforming of the signal to be transmitted by the first and second type of control mechanism.

According to a fifth aspect of the present disclosure, a receiving method for a phased array antenna is provided. A method of receiving a signal for a phased array antenna comprises providing a laser light source configured to provide an optical beam comprising one or more spectral components; and modulating the optical beam with the received signal. The method further comprises controlling a delay of the signal to be transmitted using a first type of control mechanism on the one or more spectral components, and controlling a delay of the signal to be transmitted using a second type of control mechanism on the one or more spectral components. The method further comprises controlling beamforming of the received signal by the first and second type of control mechanism.

According to a sixth aspect of the present disclosure, a computer program product is provided. The computer program is configured, when run on a computer, to carry out a transmitting method or receiving method as described.

BRIEF DESCRIPTION OF THE DRAWINGS

Embodiments of the present disclosure will now be described, by way of example only, with reference to the accompanying drawings in which.

DETAILED DESCRIPTION

Generally, the present disclosure relates to an improved optical beam forming technique based on true-time delays.

Techniques according to the present disclosure provide for control of a two-dimensional phased array antenna, i.e. an antenna having a plurality of antenna elements in each of two dimensions or directions. Such an antenna provides for beamforming in two dimensions or directions, e.g. horizontally and vertically. The beamforming in the dimensions of the phased array antenna are controlled by different optical delay process. For example, one dimension of the two-dimensional phased array antenna is controlled by group delays and a further dimension by tuning of a tunable laser light source in combination with a plurality of waveguides each having a chromatic dispersion. The two dimensions may be referred to as a first dimension and a second dimension. Aspects of the disclosure provide a hybrid control mechanism configured to control beamforming in both the first dimension and second dimension. Examples of the disclosure utilize a first type of control mechanism to control beamforming in the first dimension, and a second (i.e. different) type of control mechanism to control beamforming in the second dimension.

Compared with the conventional technique in which control for both dimensions utilizes the same beamforming technique, e.g. a group delay (e.g., one or more micro-ring resonators), control for the other dimension of the phased array antenna according to the present disclosure may utilize an independent method. Therefore, control for the phased array antenna can be significantly simplified. Techniques according to the present disclosure can thus reduce computational complexity effectively, and require lower processing capability and/or power consumption.

For simplification of illustration, techniques according to the present disclosure are described herein in the context of a two-dimensional phased array antenna. However, persons skilled in the art are to realize that the combination of beamforming processes according to the present disclosure may also be applied to a one-dimensional phased array antenna, a three-dimensional phased array antenna, (e.g. having two types of control of the antenna elements), and so on.

In the following, transmitting and receiving apparatuses and transmitting and receiving methods according to embodiments of the present disclosure are described only by way of example, and cannot be construed as a limitation of the scope of the claimed subject matter.

Figure 1:
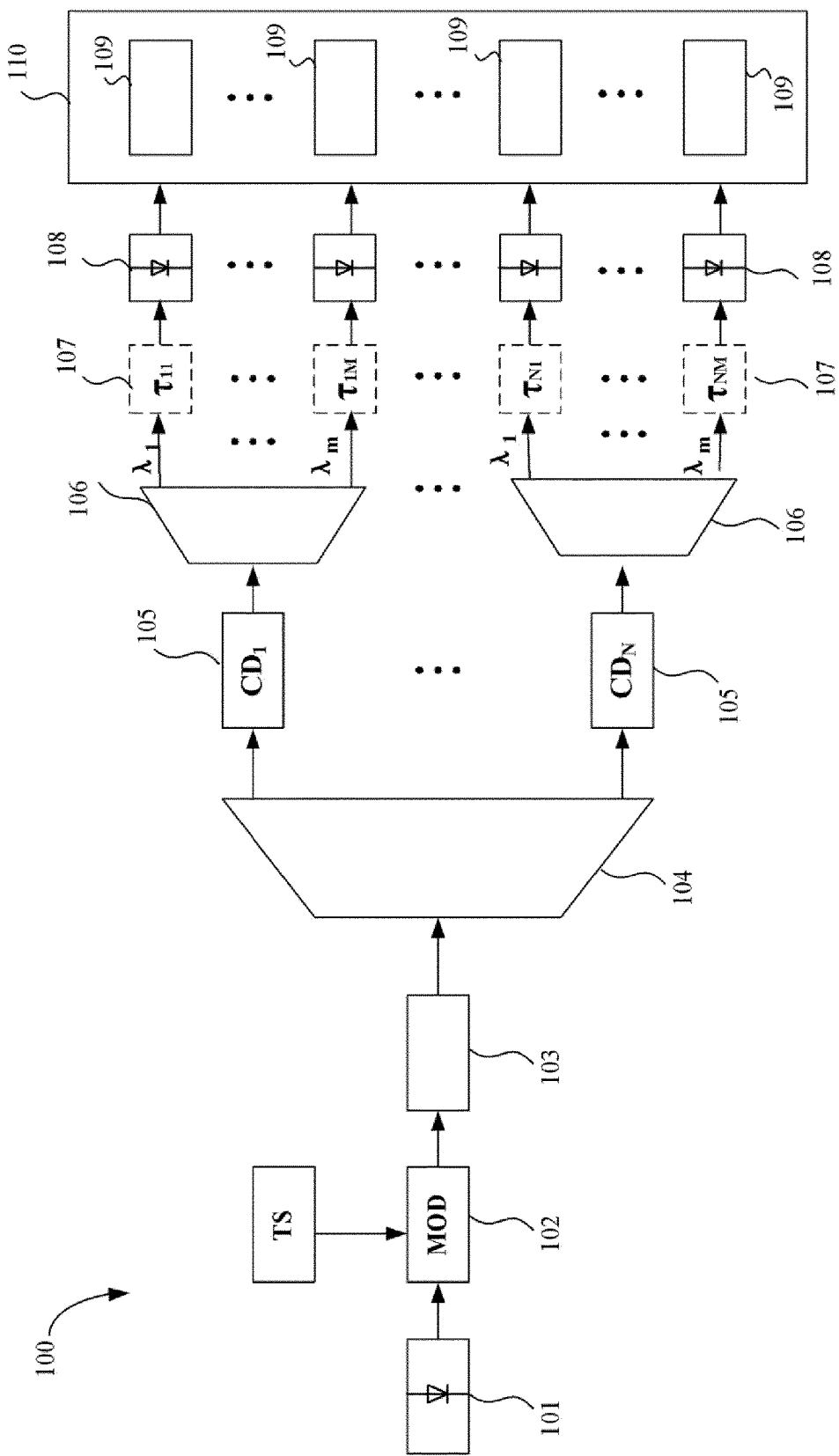
FIG. 1 is schematic illustration of a transmitting apparatus according to a first embodiment of the present disclosure.

FIG. 1 illustrates a transmitting apparatus 100 according to a first embodiment of the present disclosure. The transmitting apparatus 100 is configured to provide one or more signals to a two dimensional phased array antenna 110 to be transmitted. The phased array antenna 110 comprises a plurality of antenna elements 109. In some examples, the phase array antenna elements 109 are arranged in two-dimensional array. For example, the antenna 110 comprises M×N antenna elements 109, wherein M is a positive integer and denotes the number of rows of the phased array antenna 110, and N is a positive integer and denotes the number of columns of the phased array antenna 110, for example. In some examples, M and N are equal or greater than 2, such that there is a plurality of antenna elements 109 in each of the two dimensions.

The transmitting apparatus 100 comprises a tunable laser light source 101 configured to provide an optical beam comprising one or more spectral components. Each spectral component may be considered as a lambda or defined wavelength of light. The tunable laser light source 101 can provide a predetermined number of spectral components in an optical beam based on the number of rows or columns of a phased array antenna. In an embodiment, the number of spectral components can be equal to (or greater than) the number antenna elements in a dimension of the phased array antenna, e.g. equal to the number of rows or columns of the phased array antenna. For the phased array antenna 110, the optical beam may for example comprise M spectral components. In another embodiment, the number of spectral components (e.g. one spectral component) can be less than the number of rows or columns of a phased array antenna, an example of which will be described later. Each spectral component may be considered as an optical signal with a controlled wavelength or frequency.

The laser light source 101 can be implemented in various ways. In an embodiment, the laser light source 101 can be implemented as a plurality of independent lasers each providing a spectral component. In another embodiment, the laser light source 101 is configured to provide a laser comb obtained by modulating a single laser. In a further embodiment, the laser light source 101 can be implemented as a laser providing multiple longitudinal modes (e.g. a mode-locked laser, a Fabry-Perot laser). Persons skilled in the art will realize that any other lasers capable of providing one or more spectral components can be applied herein. It is not necessary that the different spectral components are coherent with each other.

The transmitting apparatus 100 further comprises a modulator 102 configured to modulate the optical beam provided by the laser light source 101. The modulator 102 is configured to modulate the spectral components provided by the laser light source 101 with a signal to be transmitted, i.e. a Transmission Signal, signal TS. For example, the signal TS is a radio frequency (RF) signal. In FIG. 1, the modulator 102 is illustrated as modulating the optical beam with a Transmission Signal, signal TS, to be transmitted. According to the present disclosure, the modulator 102 can be implemented as any type of modulator, e.g. a Mach-Zehnder modulator. The signal TS may be a RF signal having the radio frequency which will transmitted by the antenna 110. Alternatively, the signal TS may be a baseband signal or an intermediate frequency (IF) signal, which is later converted to a radio frequency for transmission. The spectral components output from the modulator 102 may comprise both a modulated spectral component and a corresponding unmodulated spectral component.

The transmitting apparatus 100 further comprises a group delay controlling unit 103 configured to add one or more controllable time delays to the spectral components. In FIG. 1, the group delay controlling unit 103 is illustrated to add a time delay to each spectral component in the modulated optical beam provided by the modulator 102. All of the time delays added by the group delay controlling unit 103 are controllable to implement, at the phased array antenna 110, steering of a transmission RF signal.

According to the present disclosure, the group delay controlling unit 103 can be implemented in various ways. In an embodiment, the group delay controlling unit 103 can be implemented as a photonic integrated circuit. The group delay controlling unit 103 may comprise one or more micro-ring resonators. For example, the group delay controlling unit 103 may comprise a plurality of cascaded micro-ring resonators.

A time delay of a spectral component may be controlled by one or more micro-ring resonators and realized by combining of a phase response of the rings. Each spectral component is controlled separately. As such, the group delay controlling unit 103 comprises a set of one or more micro-ring resonators for each of the spectral components having a controllable delay. For each set of ring resonators, the delay is controlled by controlling the reciprocal detuning between the resonance wavelength of the rings, and the resonance shape of the rings. The group delay controlling unit 103 is configured to provide an independent delay to each spectral component. The independent delays for the modulated spectral components, which may be controlled to be different, provide for beamforming in one dimension of the antenna.

The control of the delays provided to each spectral component, e.g. using controllable micro-ring resonators, may be considered as the first type of control mechanism to control beamforming in the first dimension of the two dimensional phased array antenna.

The first type of control mechanism controls a relative delay of signals between antenna elements using different spectral components, in this example having different wavelengths. The first type of control mechanism of beamforming is dependent on the spectral component used to generate the transmission signal at an antenna element, and so is applicable to controlling relative delays between a first subset (a row) of antenna elements, in which each first subset is generated using the same spectral component.

This control may be implemented by controlling a temperature of the rings, e.g. by controlling one or more heater(s) acting on a waveguide of the ring. The heater(s) may be electrical heater(s), for example, controlled by controlling an applied electrical current to the heater(s). Thus, for example, the delay of a modulated spectral component may be controlled by controlling the heating of a set of one or more micro-ring resonators. Alternatively, the time delay may be controlled by injecting carriers (electrons) in the waveguide of the ring. The control of a group delay to a spectral component, e.g. using micro-ring resonators, may be carried out using any known method.

Persons skilled in the art will realize that the group delay controlling unit 103 can be implemented as any other types of components and/or integrated circuits which can provide a time delay to a modulated spectral component.

Although FIG. 1 illustrates only one group delay controlling unit 103 for providing delays separately to a plurality of the spectral components, persons skilled in the art can realize that the transmitting apparatus can be considered as comprising more than one group delay controlling unit, each configured to add a respective time delay to a spectral component.

The transmitting apparatus 100 further comprises a splitter 104 configured to split the optical beam into a plurality of optical sub-beams. Each optical sub-beam has the same spectral components as the optical beam. In an embodiment, the splitter 104 is configured to split the optical beam into a number of sub-beams which is based on the number of antenna elements in a dimension of the phased array antenna. As shown in FIG. 1, the splitter 104 is configured to split the optical beam provided by the group delay controlling unit 103 into N optical sub-beams. Each sub-beam comprises the same M spectral components as in the single optical beam, provided by the group delay controlling unit 103.

In some aspects, the transmitting apparatus 100 further comprises a plurality of waveguides 105 configured to guide the optical beam. One of the waveguides 105 receives the optical sub-beam from each of the plurality of outputs of the splitter 104. According to the present disclosure, each of the plurality of waveguides 105 has a chromatic dispersion, CD. The chromatic dispersion defines the variation in time delay according to the wavelength (or frequency) of the spectral components. A time delay will be provided to each spectral component passing through one of the plurality of waveguides 105. The time delay introduced by the waveguide 105 with a chromatic dispersion is dependent on the wavelength of the spectral component. Therefore, different wavelengths associated with the different spectral components have different time delays introduced when they pass through the same waveguide.

The plurality waveguides 105 have different chromatic dispersions from each other. This provides for different time delays to be introduced for the same spectral component passing through the plurality of waveguides 105. Exactly because of this, the laser light source 101 can control time delays added by the waveguides 105 by tuning (i.e. changing) the wavelength of a spectral component. The same wavelength change is made to the spectral component transmitted by the plurality of waveguides. The tuning of the laser light source may be a tuning of the originating laser light source, or a frequency change applied after generation of the laser light. Since the plurality of waveguides 105 have different chromatic dispersions, the effect (in terms of time delay) of the wavelength change is different for each waveguide with a different chromatic dispersion. Thus, the waveguides 105 each provide a different additional delay to the same spectral component, as the spectral component varies in frequency. Thus, controlling the wavelength provides for controlling of beam forming (e.g. steering the beam) in one dimension of the phased array antenna 110.

The changing of the wavelengths of the spectral components to control the beam forming using the waveguides 105 is applicable to frequencies of the spectral components. For a particular frequency, the waveguides 105 introduce a time delay which is particular to each waveguide. The apparatus 100 is configured to control the frequency of that spectral component, and in some examples, control the frequency of each spectral component to maintain the same frequency spacing. For the particular spectral component, the same change in frequency introduces different additional time delays in the different waveguides, due to the different chromatic dispersions. The different time delays provide for a different beam forming, e.g. different beam forming direction. This change in delay is applicable separately to each of the spectral components.

According to the present disclosure, values of chromatic dispersions of the waveguides 105 may have a linear relationship with one another. In such a case, time delays caused by the waveguides 105 can also have a linear relationship with one another as the wavelength of a spectral component provided by the light source 101 is varied. This allows control of the phased array antenna easier and more precise. As such, values of the chromatic dispersions of the waveguides 105 may increase by a constant amount between equally spaced antenna elements along a dimension of the antenna. For example, the chromatic dispersion ($CD_i$) of a general waveguide 105 labelled as number i, (e.g. based on position in the antenna of the antenna element) may be defined as:

$$CD_i = CD_0 + i \cdot \Delta CD$$

where $CD_0$ is the chromatic dispersion of a reference (or first) waveguide, and $\Delta CD$ is a difference in chromatic dispersion between waveguides 105 corresponding to adjacent antenna elements. As described, $\Delta CD$ has the same value between each equally spaced antenna element.

The chromatic dispersions can have various linear relationships with one another. The chromatic dispersions may be considered as scaled. In another embodiment, the chromatic dispersions can form an arithmetic progression. However, persons skilled in the art will realize that any linear relationship may be used.

As illustrated in FIG. 1, N waveguides 105 are included in the transmitting apparatus 100 with N chromatic dispersions different from one another, $CD_1, \ldots, CD_N$. Each waveguide 105 guides an optical sub-beam comprising all spectral components received from the splitter 104. For example, a first waveguide with a chromatic dispersion $Cd_1$ guides a first optical sub-beam, a second waveguide with a chromatic dispersion $CD_2$ guides a second optical sub-beam, and a Nth waveguide with a chromatic dispersion $CD_N$ guides the Nth optical sub-beam, and so on. As described above, as the same spectral component passes through the N waveguides 105 respectively, N time delays will occur. Also, when an optical sub beam passes through one of the N waveguides 105, the M different spectral components therein will receive different time delays.

The waveguides 105 may cause different amounts of (e.g. scaled) time delays by adjusting a wavelength of the specific spectral component, i.e. making the wavelength of the specific spectral component to deviate from its nominal wavelength. For example, a ratio between time delays caused by a first waveguide with a first chromatic dispersion and a second waveguide with a second chromatic dispersion may change in direct proportion with deviation of the wavelength of the specific spectral component from its nominal wavelength. Based on this, the tunable laser light source 101 can control time delays added by waveguides more precisely.

The control of the delays provided, e.g. by a tuning of the wavelengths of the laser light source, may be considered as the second type of control mechanism to control beamforming in the second dimension of the two dimensional phased array antenna.

The second type of control mechanism controls a relative delay of signals between antenna elements using the same spectral component. The second type of control mechanism of beamforming is independent of the spectral component used to generate the transmission signal at an antenna element, and so is applicable to controlling relative delays between a second subset (a column) of antenna elements, in which each second subset is generated using different spectral components.

The waveguides 105 can be implemented in various ways, for example, using spools of mixed fibers with scaled total chromatic dispersions, using PCF (photonic crystal fiber) with tailored chromatic dispersions or tailoring nano-photonics slot waveguides.

The transmitting apparatus 100 can comprise a plurality of demultiplexers 106 each configured to demultiplex or separate spectral components from one another. As illustrated in FIG. 1, each demultiplexer 106 is configured to receive an optical sub-beam from a respective waveguide 105 and demultiplex or separate M spectral components in the optical sub-beam from one another to obtain M separated spectral components (i.e., $\lambda_1 \ldots \lambda_m$). Each spectral component is now separate to the other spectral components generated by the laser source, and may be considered as a separate sub-beam. The separated sub-beams may comprise one or more spectral components corresponding to the same spectral component generated by the laser source 101, e.g. comprising both a modulated spectral component and an unmodulated spectral component.

One of the demultiplexers 106 is connected to an output of each of the plurality of waveguides 105 providing chromatic dispersion. Thus, in total the demultiplexers 106 provide N×M outputs.

The demultiplexers 106 can be implemented in various well-known ways which thus are not described herein in details. Persons skilled in the art can realize that the demultiplexers 106 are not necessary if the optical beam provided by the laser light source 101 comprises only one spectral component. Also, although the demultiplexers 106 are illustrated as independent entities, persons skilled in the art can realize that they can be integrated into a single entity with one or more further components, e.g. using photonic integration.

According to the present disclosure, in order to more precisely control the beam direction or pointing angle of a phased array antenna (i.e. steering of a RF signal) over a particular range of directions, the transmitting apparatus 100 may comprise a plurality of calibrators 107.

The calibrators 107 are each configured to add a calibration time delay to a respective spectral component. The calibration time delay is such that the spectral component at its nominal wavelength would result in a central or 'zero' degree angle of a beam direction from the phased array antenna after the spectral component passes though all of the plurality of waveguides 105. The calibrators 107 each add a fixed calibration delay to the spectral component. The fixed calibration delay provided by the calibrators 107 is different for each waveguide and each spectral component.

According to the present disclosure, the calibration time delay is associated with a nominal wavelength of a spectral component provided by the laser light source 100 and a chromatic dispersion of a waveguide through which the spectral component passes. In this disclosure, a nominal wavelength of a spectral component is defined as an initial wavelength of a spectral component provided at the laser light source 100. It can be selected or determined as appropriate.

According to the present disclosure, a direction of a signal transmitted or received by a phased array antenna can be controlled by tuning wavelengths of spectral components provided by the laser light source 101, and thus tuning time delays added by waveguides. This means that, for a nominal wavelength (i.e. with no tuning or a reference tuning value) of a specific spectral component provided by the laser light source 101, there is a need to make the total path between the laser light source and the phased array antenna 110 introduce exactly same time delay for all of the waveguides 105. The calibration time delay provides an additional time delay dependent on the time delay provided by the corresponding connected waveguide 105 for each spectral component, such that the sum of the calibration time delay and the waveguide time delay 105 has a same value of a cumulated delay for all antenna elements when the beam is pointing in the zero angle direction.

Figure 7:
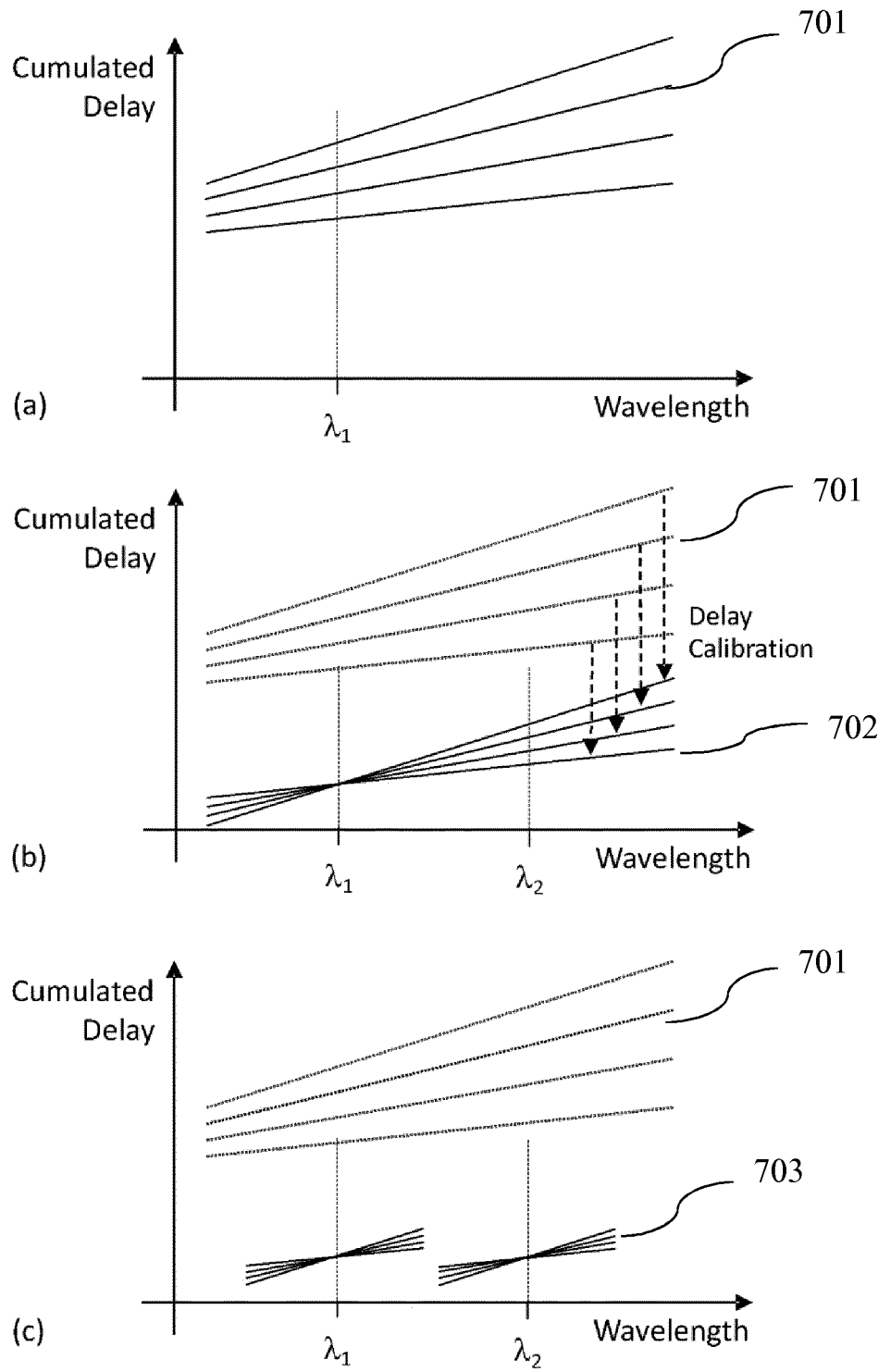
FIGS. 7a, 7b, 7c provide a schematic illustration of a calibration time delay.

In the following, an example is provided in combination with FIG. 7 to illustrate to the apparatus 100 introducing the same time delay for all antenna elements. In this example, the transmitting apparatus 100 comprises four waveguides 105 each having a chromatic dispersion, referred to as CD1, CD2, CD3 and CD4. The laser light source 101 provides two spectral components with nominal wavelength $\lambda_1$ and $\lambda_2$ respectively.

In this arrangement, as shown in FIG. 7a, for a nominal wavelength $\lambda_1$ of the first of the two spectral component, the four waveguides 105 will cause four different time delays 701 (not equal to one another), e.g. T1, T2, T3, and T4 due to their different chromatic dispersions, e.g. at wavelength $\lambda_1$. FIG. 7a shows the delay 701 caused by the waveguides 105 without a calibration delay.

In order to make the cumulative total time delays introduced by the four waveguides to be equal to one another at the nominal wavelength of $\lambda_1$ of the first spectral component, the calibrators 107 are required to add calibration time delays (e.g. c1, c2, c3, c4) to make up their difference to the same cumulative delay. For example, the cumulative delay=c1+T1=c2+T2=c3+T3=c4+T4.

FIG. 7b shows an effect of adding a single calibration delay which is particular to each of the four waveguides 701. The calibrated delays 702 are increased such that at the nominal wavelength $\lambda_1$, the calibrated delays are the same cumulative delay. Note that although FIG. 7b shows calibrated delays 702 below the waveguide delays 701, the calibrated delays 702 are longer i.e. since each has an additional calibration delay. The calibrated delays 702 in FIG. 7b have been calibrated only for a single wavelength $\lambda_1$, and hence difference cumulative delays are seen for the waveguides carrying a different nominal wavelength $\lambda_2$.

The four waveguides cause different time delays on the first spectral component than on the second spectral component. The added calibration time delays for $\lambda_1$ do not make the cumulative total time delays for $\lambda_2$ to be equal to each other. Thus, the calibration time delays for $\lambda_1$ are different from those for $\lambda_2$.

FIG. 7c shows a total time delay 703 for $\lambda_1$ is equal for each waveguide after adding a first set of calibrations time delays to the first spectral component. Also, a total time delay 703 for $\lambda_2$ is equal for each waveguide after adding a second set of calibrations time delays to the second spectral component. However, the first set of calibration time delays are different from the second time delays. Obviously, the calibration time delay is also associated with or changes with (a nominal wavelength of) a spectral component. Thus, the calibration time delay is particular for each waveguide 105 adding chromatic dispersion and for each spectral component.

Further, when controlling a direction of a signal transmitted or received by a phased array antenna, nominal wavelengths of spectral components provided by the laser light source and chromatic dispersions of the waveguides are generally not changed once they are selected. Also, according to the present disclosure, the calibration is directed to only the nominal wavelength of each spectral component, rather than all wavelength of the spectral component. For a nominal wavelength of a specific spectral component and a chromatic dispersion of a specific waveguide, a calibration time delay that needs to be added is thus unchanged. Thus, there is no need to dynamically adjust the calibration time delays when controlling a phased array antenna.

Returning to FIG. 1, for a first of the M spectral components which passes through a waveguide with a chromatic dispersion $CD_1$, a respective calibration time delay $T_{11}$ is added. For a Mth of the M spectral components which passes through a waveguide with a chromatic dispersion $CD_1$, a respective time delay $T_{1M}$ is added.

For a first of the M spectral components which passes through a waveguide with a chromatic dispersion $CD_N$, a respective time delay $T_{N1}$ is added. Also, for a Mth of the M spectral components which passes through a waveguide with a chromatic dispersion $CD_N$, a respective time delay $T_{NM}$ is added. As described above, the added calibration time delays (e.g. $T_{11}$, $T_{1M}$, $T_{N1}$, $T_{NM}$) are unchanged during controlling of the direction of the signal transmitted or received by the phased array antenna, since the laser light source 101 and the waveguides 105 are unchanged. The calibration delays merely set the zero or central beam direction, e.g. perpendicular to the plane of the antenna.

Further, according to the present disclosure, calibrators 107 can be implemented in various ways, for example, as one or more micro-ring resonators.

Although the calibrators 107 are illustrated as following the demultiplexers 106, persons skilled in the art can realize that the calibrators 107 can be located at other locations of the transmitting apparatus, such as before or after the waveguides 105. Moreover, although the calibrators 107 are illustrated as independent entities, persons skilled in the art can realize that they can be integrated into a single entity with one or more other elements according to the present disclosure.

The transmitting apparatus 100 further comprises a plurality of optical heterodyning devices 108 each configured to receive the optical sub-beam from the respective calibrator 107 and generate a RF signal from the optical sub-beam by heterodyning spectral components. The heterodyning device 108 is configured for optical heterodyne detection. In some examples, the optical heterodyning device 108 is one or more photodiodes.

Each heterodyning device 108 is configured to generate a signal at a frequency difference between two spectral components, i.e. between an unmodulated spectral component and a modulated spectral component. In this example, the modulated and unmodulated spectral components originating from the same wavelength of the laser light source. The difference between them is therefore the radio frequency signal added by the modulator 102. The heterodyning device 108 therefore outputs the modulation RF signal, which is at a radio frequency suitable for transmission. The optical beamforming carried out by the intermediate stages provides for control in two dimensions of the antenna.

The heterodyning devices 108 are configured to transmit the generated RF signals to antenna elements of the phased array antenna 110. The RF signals generated from the optical sub-beams having calibration time delays $T_{11}, \ldots, T_{1M}$ are configured to be transmitted via M antenna elements in the first column of the phased array antenna 110, the RF signals generated from the optical sub-beams having calibration time delays $T_{N1}, \ldots, T_{NM}$ are transmitted via M antenna elements in the Nth column of the phased array antenna 110.

For example, the two-dimensional antenna may comprise M rows and N columns. Within each row, the RF signal transmitted is generated from a same wavelength. Each of M rows uses one of the M wavelengths generated by the laser light source. Controlling the relative delay within each row controls a horizontal beamforming, e.g. left to right direction control. The control within each row is made by tuning the wavelengths of the laser light source, e.g. all spectral components varied together by the same change in wavelength. The variation in wavelength causes the waveguides 105 to introduce a changed time delay due to their chromatic dispersion. In this example, there are N columns within each row, corresponding to the N chromatic dispersions. Within each row, each of the N antenna elements 109 has a delay which is varied relative to another antenna element of the row by the variation in wavelength and resultant varied delay due to the chromatic dispersion of a waveguide 105. Thus, delay is controlled and varied within a row, and the horizontal beamforming is controlled. This effect is the same for each row. Although the other rows use different wavelength spectral components, the wavelength shift of each spectral component is the same. The calibration delays are configured such that the cumulative delay in each row whilst tuning (varying wavelength) of the spectral components is the same. Thus, although each row uses a different spectral component, the transmission delays from the antenna elements of the M rows correspond for each row. As such, all antenna elements are able to contribute to beamforming in that dimension, e.g. horizontally, by tuning the spectral components.

The antenna is configured to independently control beamforming in the other direction, e.g. vertically. In this case, control is carried out by the group delay controlling unit 103. The group delay controlling unit 103 is configured to add a particular (different) delay to each of the M wavelengths. Each row of the antenna uses a single wavelength. In each column, a plurality of wavelength spectral components are used for different antenna elements 109. As such, a delay added by the group delay controlling unit 103 is different for each of the M rows of the antenna 110. All antenna elements are able to contribute to beamforming in that dimension, e.g. vertically, by adding separate delays to each of the spectral components using the group delay controlling unit 103. The optical connections between the heterodyning device 108 associated with each antenna element 109 and the laser light source are arranged to provide the described functionality. In particular, the antenna 110 may be arranged in a regular grid. The apparatus 100 provides for the same one of the M wavelengths to be in the same row, and provides for the same chromatic dispersion waveguide 105 to be used for each column.

The time delays controlled by tuning of the spectral component frequencies and by controlling the group delays added to each spectral component are independent. Thus, the antenna may control beamforming in either one, or any combination, of the two dimensions. The two different control mechanisms provide for a simple and flexible two-dimensional control.

According to the present disclosure, the transmitting apparatus 100 and the phased array antenna 110 can be arranged in various ways. In an embodiment, the transmitting apparatus 100 can be integrated with the phased array antenna 110 entirely or partly, or connected and separate from the antenna 110. For example, the laser light source 101 and the group delay controlling unit 103 can be integrated in a base station, and the 105 waveguides can be integrated with the phased array antenna 110. In this example, since both of the laser light source 101 and the group delay controlling unit 103 can be integrated in the base station, all controls according to the present disclosure can be conveniently implemented in the base station. In an alternative embodiment, the transmitting apparatus 100 can be separated from the phased array antenna 110 completely.

Figure 2:
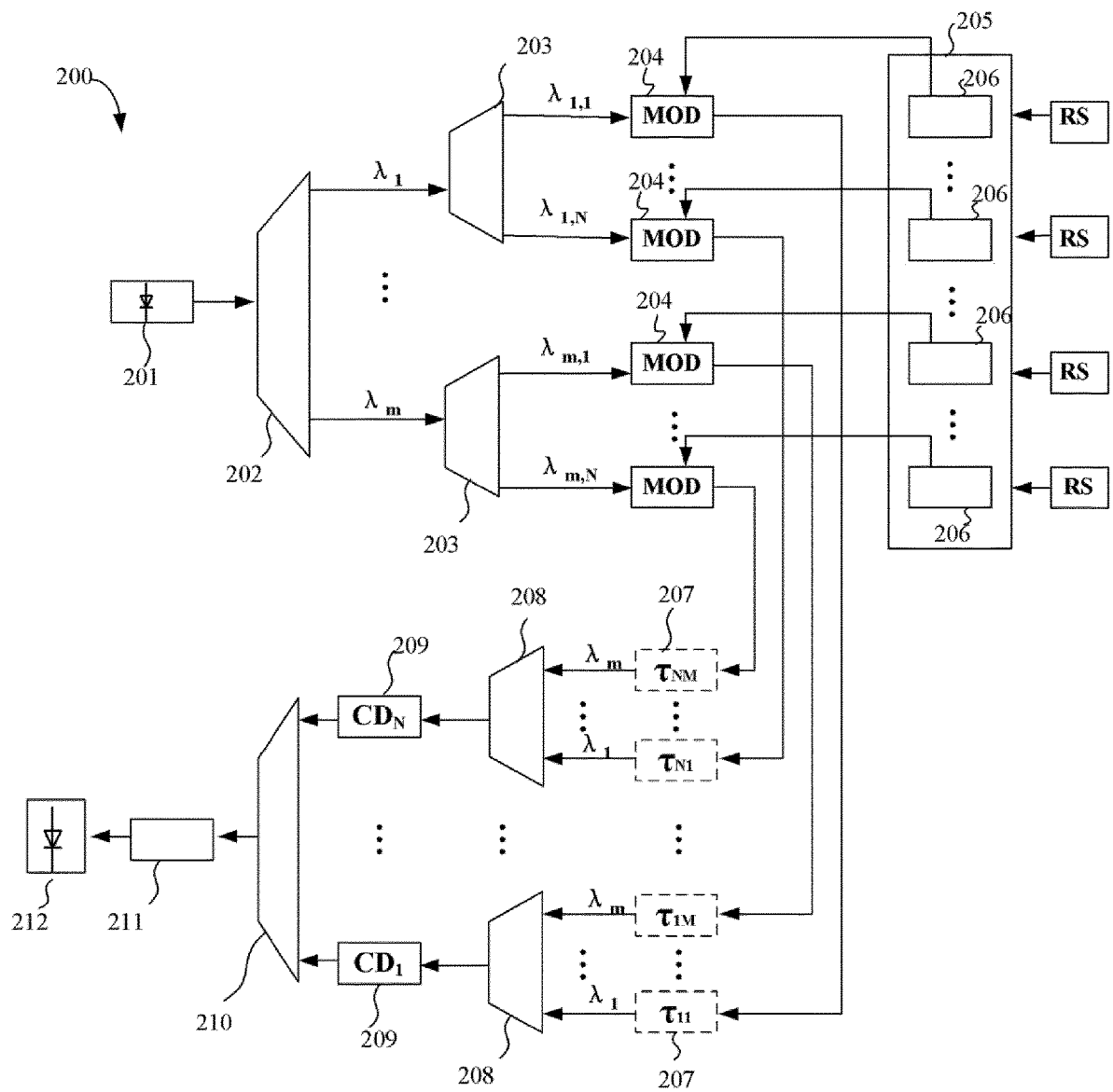
FIG. 2 is schematic illustration of a receiving apparatus according to a first embodiment of the present disclosure.

FIG. 2 illustrates a receiving apparatus 200 according to a first embodiment of the present disclosure. The receiving apparatus 200 may be used in association with the transmitting apparatus 100, and in some examples, shows one or more elements, e.g. a laser light source, which are as described for the transmitting apparatus. The receiving apparatus 200 is configured to receive one or more RF signals from wireless terminals, e.g. user equipment or mobile devices. In an embodiment, the signals may be single RF signals or multiple independent RF signals. A phased array antenna 205 is functionally and physically the same as the phased array antenna 110 in FIG. 1, and the same antenna may be used for both transmitting and receiving.

As described for the transmitting apparatus 100, the receiving apparatus 200 may comprise a laser light source 201, demultiplexers 202, splitters 203, modulators 204, calibrators 207, waveguides 209 each having a chromatic dispersion, a group delay controlling unit 211 and an optical heterodyning device 212. These components have corresponding functions to the laser light source 101, the demultiplexers 106, the splitters 104, the modulator 102, the calibrators 107, the waveguides 105, the group delay controlling unit 103, and the optical heterodyning devices 108 of the transmitting apparatus 100. The arrangement of these components for receiving is described below.

The receiving apparatus 200 further comprises a plurality of multiplexers 208 and a combiner 210. Each multiplexer 208 is configured to multiplex a plurality of optical sub-beams each having a spectral component into a single optical beam having more than one spectral components. The combiner 210 is configured to combine a plurality of sub-beams each having one or more spectral components into a single optical beam having the one or more spectral components. The multiplexers 208 and the combiner 210 can be implemented in any known way.

As illustrated in FIG. 2, the laser light source 201 is configured to provide an optical beam comprising M spectral components. The laser light source 201 can be tunable to control time delays added by the waveguides 209. This allows for receive beamforming, i.e. controlling a direction from which the antenna receives a transmission. As above, the two-dimensional antenna is configured to provide for receive beamforming in two dimensions The demultiplexer 202 is configured to receive the optical beam from the laser light source 201, and demultiplex or separate the M spectral components in the optical beam from one another to obtain M independent optical beams (i.e., $\lambda_1 \ldots \lambda_m$ each having a spectral component.

A plurality of splitters 203 are configured to receive the separate spectral components, i.e. one of the plurality of splitters 203 receives one spectral component. Each splitter 203 is configured to split the spectral component into N optical sub-beams each having the same spectral component as the respective optical beam. For example, an optical beam having a spectral component $\lambda_1$ is split into N optical sub-beams each having the same spectral component $\lambda_1$ (i.e. all of spectral components $\lambda_{1,1} \ldots \lambda_{1,N}$ are the same spectral component $\lambda_1$). An optical beam having a spectral component $\lambda_M$ is split into N optical sub-beams each having the same spectral component $\lambda_M$ (i.e. all of spectral components $\lambda_{m,1} \ldots \lambda_{m,N}$ are the same spectral component $\lambda_m$).

The N×M sub-beams are each passed to a modulator 204, one sub-beam per modulator 204. Each modulator 204 is configured to receive an optical sub-beam from a respective splitter 203 and modulate it with a radio frequency signal RS received at a respective antenna element 206 of the phased array antenna 205. For example, an optical sub-beam having a spectral component $\lambda_{1,1}$ is modulated with a signal received by an antenna element 206 at the first row and the first column of the phase array antenna 205. An optical sub-beam having a spectral component $\lambda_{1,N}$ is modulated with a signal received by an antenna element 206 at the first row and the Nth column of the phase array antenna 205. An optical sub-beam having a spectral component $\lambda_{m,1}$ is modulated with a signal received by an antenna element 206 at the Mth row and the first column of the phase array antenna 205. An optical sub-beam having a spectral component $\lambda_{m,N}$ is modulated with a signal received by an antenna element 206 at the Mth row and the Nth column of the phase array antenna 205.

Each modulated sub-beam is passed to an individual calibrator 207. Each calibrator 207 is configured to add a calibration time delay to an optical sub-beam from a respective modulator 204, as described above in detail. As shown in FIG. 2, the added calibration time delays are $T_{11}, \ldots, T_{1M}, \ldots, T_{N1}, \ldots, T_{NM}$, for example.

A plurality of multiplexers 208 are configured to receive and multiplex M optical sub-beams (respectively having spectral components $\lambda_1 \ldots \lambda_m$) associated with antenna elements 206 of one of the dimensions (e.g. column) of the phased array antenna 205. Each multiplexer 208 multiplexes modulated spectral components to obtain a single optical beam having all of the spectral components $\lambda_1 \ldots \lambda_m$. For example, a first multiplexer 208 is configured to multiplex M optical sub-beams from M calibrators associated with antenna elements 206 at a first column of the phased array antenna 205, and the Nth multiplexer 208 is configured to multiplex M optical sub-beams from M calibrators associated with antenna elements 206 at the Nth column of the phased array antenna 205. The apparatus 200 comprises N multiplexers 208.

As shown in FIG. 2, multiplexed sub-beams from the multiplexers 208 are passed to a plurality of waveguides 209, e.g. N waveguides 209. Thus, each waveguide 209 receives all wavelengths from a corresponding one of the plurality of multiplexers 208. The waveguides 209 each have a different chromatic dispersion, such as $CD_1, \ldots, CD_N$. The chromatic dispersions can be the same as those of the transmitting apparatus 100.

As described above, time delays for one dimension of the phase array antenna can be controlled by tuning the wavelengths of the spectral components provided by the laser light source 201 in combination with the N waveguides 209 with different chromatic dispersions. Each waveguide 209 is configured to guide an optical beam from a respective multiplexer 208.

The combiner 210 is configured to receive optical beams from the N waveguides 209 and combine the optical beams into a single optical beam.

The group delay controlling unit 211 is configured to receive the single optical beam from the combiner 210 and add M time delays to the single optical beam. In particular, the group delay controlling unit 211, as described for the group delay controlling unit 103, is configured to add a controlled and different time delay to each spectral component.

The receiving apparatus 200 further comprises an optical heterodyning device 212 configured to receive the optical beam from the group delay controlling unit 211 and generate a RF signal from the optical beam by heterodyning spectral components. The heterodyning device 212 is configured for optical heterodyne detection. In some examples, the optical heterodyning device 212 is one or more photodiodes. The heterodyning is between an unmodulated spectral component and a same spectral component which has been modulated with the RS signal.

In a corresponding process to the transmission beamforming described above, the apparatus 200 is configured to provide for two-dimensional receive beamforming. The control of the wavelengths of the spectral components provides for control of the receive beam in one dimension (e.g. a horizontal direction). The antenna elements 206 in a row use the same spectral component, the plurality of antenna elements 206 in a row modulate optical signals which are passed to different waveguides 209. Thus, different delays are added by the different chromatic dispersions depending on the tuning of the spectral components laser light source 201. Beamforming control in the other dimension (e.g. vertically) may be achieved with the group delay controlling unit 211. The group delay controlling unit 211 is common for all spectral components. The delay applied by the group delay controlling unit 211 is particular to the spectral component, such that the different spectral components used by the different rows of the antenna 205 may have different delays applied. This provides for beamforming in the vertical dimension (i.e. controlling an up or down direction from which a signal RS is received).

Figure 3:
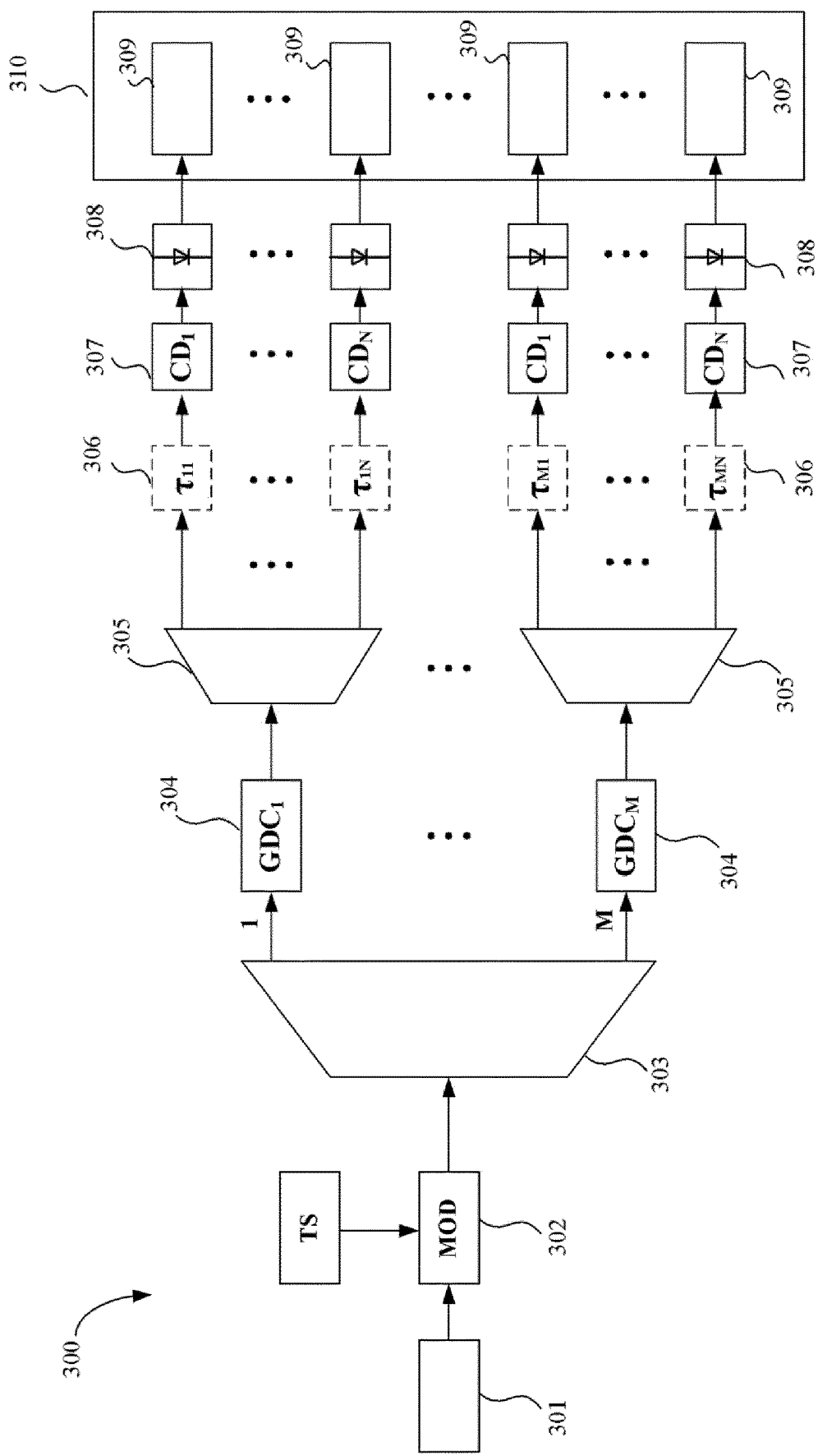
FIG. 3 is schematic illustration of a transmitting apparatus according to a second embodiment of the present disclosure.
Figure 4:
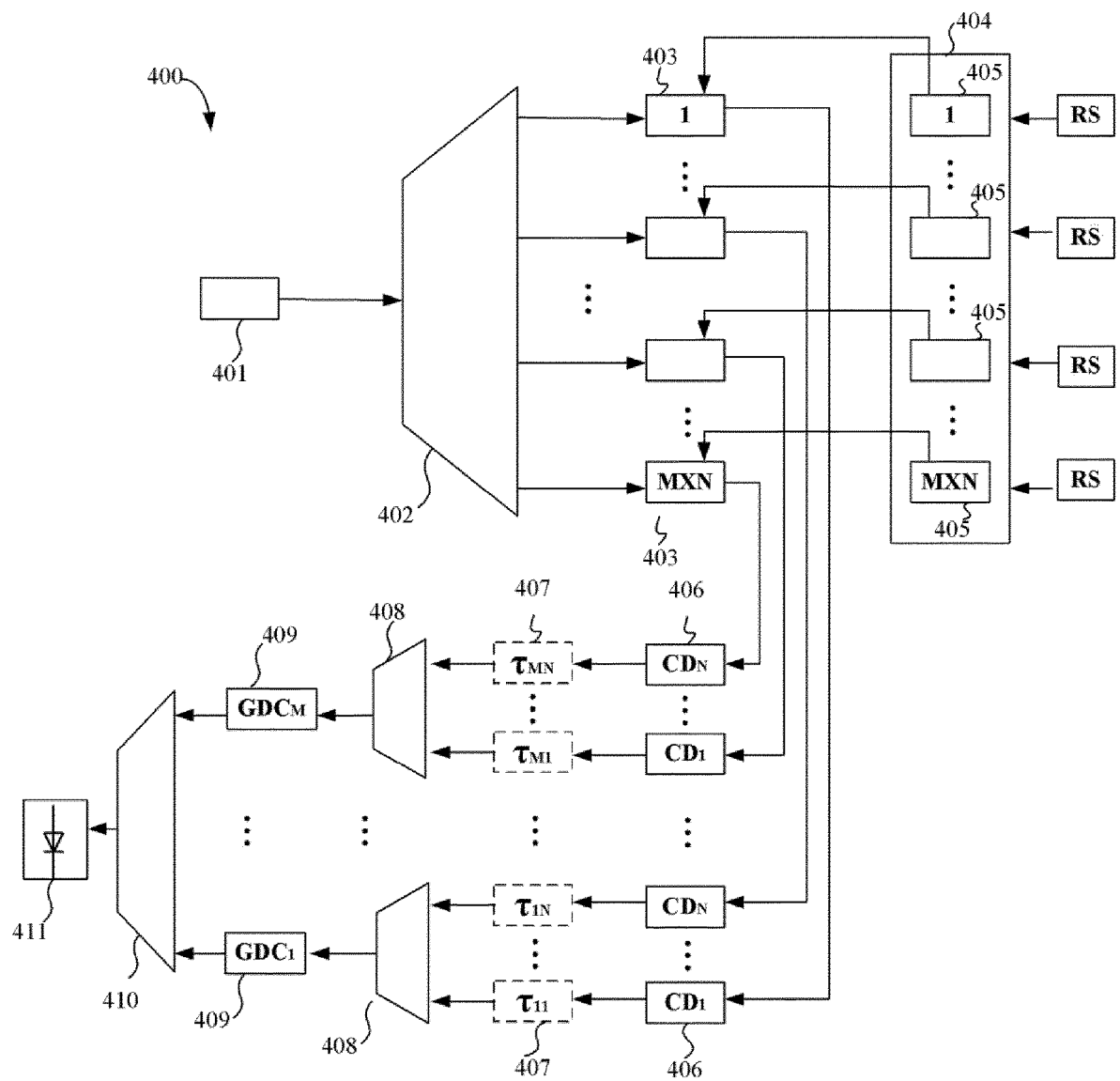
FIG. 4 is schematic illustration of a receiving apparatus according to a second embodiment of the present disclosure.

FIG. 3 and FIG. 4 respectively illustrate a transmitting apparatus 300 and a receiving apparatus 400 according to a second embodiment of the present disclosure.

All parts according to the second embodiment of the present disclosure have the same function and construction options as those according to the first embodiment of the present disclosure, except where described or shown as different.

The apparatus 301, 401 provides for the same functionality of optical beamforming in two dimensions independently, using a separate control process for each dimension, as described above. In FIG. 3, a phased array antenna 310 has the same functionality and arrangement as the phased array antenna 110 in FIG. 1.

Further, as with the transmitting apparatus 100, the transmitting apparatus 300 may comprise a laser light source 301, a modulator 302, a splitter 303, M group delay controlling units 304, splitters 305, calibrators 306, waveguides 307 each having a chromatic dispersion, and optical heterodyning devices 308. These components have the same functions as the laser light source 101, the modulator 102, the splitters 104, the group delay controlling unit 103, the calibrators 107, the waveguides 105, and the optical heterodyning devices 108 of the transmitting apparatus 100.

The laser light source 301 is configured to provide an optical beam comprising one used spectral component. The laser light source 301 can be tunable to control time delays added by the waveguides 307, in order to control beamforming in one dimension. The modulator 302 is configured to receive the optical beam from the laser light source 301 and modulate it with a signal TS to be transmitted, e.g. a RF signal, as described above.

The splitter 303 is configured to split the modulated optical beam into M optical sub-beams all of which have the same wavelength spectral component. In some aspects, the splitter may be considered as outputting a plurality (i.e. M) spectral components. This is analogous to the embodiment of FIG. 1, although in this case the plurality of spectral components have the same wavelength. Each optical sub-beam comprises a modulated and non-modulated component.

M group delay controlling units 304 (i.e. $GDC_1, \ldots, GDC_M$) are each configured to receive a respective optical sub-beam from the splitter 303 and add a controllable time delay to the respective optical sub-beam. For example, $GDC_1$ is configured to add time delay $T_1$ to the first optical sub-beam from the splitter 303, and $GDC_M$ is configured to add time delay $T_M$ to the Mth optical sub-beam from the splitter 303. The time delay added may be different for each sub-beam. Each group delay controlling unit 304 may have the same functionality and construction as the group delay controlling unit 103 described above.

M splitters 305 corresponding to the M group delay controlling units 304 are each configured to receive an optical sub-beam from a respective group delay controlling unit 304 and further split the received sub-beam into N optical sub-beams. Each of the N sub-beams generated by a particular one of the splitters 305 is the same.

The sub-beams are each further transmitted to a calibrator 306. For example, M×N calibrators 306 are each configured to receive an optical sub-beam from the splitter 505 and add a calibration time delay to it. The added calibration time delays are illustrated as $T_{11} \ldots T_{1N} \ldots T_{M1} \ldots T_{MN}$. In an embodiment, the calibrators 306 can be located in other locations of the transmitting apparatus 300, e.g. after the waveguides 307. As above, the calibrators 306 add a calibration delay dependent on both the group delay added and on a chromatic dispersion of the corresponding waveguide 307. The calibrators determine a central or zero direction of the beam.

The calibrators 306 are arranged to pass the spectral components to waveguides 307 each having a pre-determined chromatic dispersion. For example, M sets of N waveguides 307 are configured to guide the optical sub-beams from the calibrators 306. In particular, each waveguide is configured to guide an optical sub-beam from a respective calibrator. In FIG. 3, chromatic dispersions are the same for each set of N waveguides. Each set of N waveguides have N chromatic dispersions, such as $CD_1, \ldots, CD_N$. For example, the top set of N waveguides have the same N chromatic dispersions as the bottom set of N waveguides in FIG. 3. The apparatus 300 comprises M sets of waveguides. As above, the different chromatic dispersion of the waveguides 307 is used in conjunction with the controlled variation of the wavelength of the spectral components to control the relative delay between transmission signals generated using the same spectral component, i.e. delayed by the same group delay controlling unit 304.

The waveguides 307 are each arranged to output the delayed spectral components to a heterodyning device 308. For example, M×N optical heterodyning devices 308 are each configured to receive the optical sub-beam from the respective waveguide 307 and generate a RF signal from the optical sub-beam. The heterodyning device 308 is configured for optical heterodyne detection. In some examples, the optical heterodyning device 308 is one or more photodiodes.

Further, each optical heterodyning device 308 is configured to transmit the generated RF signal to a respective one of antenna elements 309 of the phased array antenna 310 to be transmitted via the antenna element 309.

FIG. 4 illustrates a receiving apparatus 400 according to a second embodiment of the present disclosure. The receiving apparatus 400 may be associated with the transmitting apparatus 300 and is configured to receive one or more RF signals from one or more wireless terminals, e.g. a user equipment or wireless device. In an embodiment, the signals may be single RF signals or multiple independent RF signals. A phased array antenna 404 is the same as the phased array antenna 110 in FIG. 1.

As with the transmitting apparatus 300, the receiving apparatus 400 may comprise a laser light source 401, a splitter 402, modulators 403, waveguides 406 each having a chromatic dispersion, calibrators 407, group delay controlling units 409, and an optical heterodyning device 411. These components have the same functions as the laser light source 301, the splitters 303 or 305, the modulator 302, the waveguides 307, the calibrators 306, the group delay controlling unit 304, and the optical heterodyning devices 308 of the transmitting apparatus 300.

Unlike the transmitting apparatus 300, the receiving apparatus 400 further comprises combiners 410 and 408. Each of the combiners 410 and 408 is configured to combine a plurality of sub-beams into a single optical beam. The combiners 410 and 408 can be implemented in any known way.

As illustrated in FIG. 4, the laser light source 401 is configured to provide an optical beam comprising one spectral component. The laser light source 401 can be tunable to control time delays added by the waveguides 406, i.e. to control beamforming in one dimension.

The splitter 402 is configured to split the optical beam into M×N optical sub-beams, i.e. equal to the number of antenna elements 405 of a phased array antenna 404 (i.e. M×N antenna elements 405). All of the M×N optical sub-beams have the same wavelength spectral component as the optical beam.

M×N modulators 403 are each configured to receive a respective optical sub-beam from the splitter 402 and modulate the received spectral component with a signal RS received from a respective antenna element 405 of the phased array antenna 404. The signal RS is generally a radio frequency signal.

A plurality (e.g. M sets of N) waveguides 406 are configured to guide the optical sub-beams from the modulators 403. The sub-beams comprise modulated and non-modulated spectral components. In particular, the M sets of N waveguides have the same set of chromatic dispersions, with each set of N waveguides have N chromatic dispersions, such as $CD_1, \ldots, CD_N$ In an embodiment, each set of N waveguides are configured to respectively guide the optical sub-beams from the modulators 403 associated with N antenna elements 405 in a respective row of the phased array antenna 405.

The waveguides 406 are each configured to output the optical signals to a calibrator 407. For example, M×N calibrators 407 are each configured to receive an optical sub-beam from a respective waveguide 406 and add a calibration time delay to the spectral components. The added calibration time delays are illustrated as $T_{11}, \ldots, T_{1M}, \ldots, T_{N1}, \ldots, T_{NM}$.

The calibrators 508 are configured to output the calibrated spectral components to a plurality of combiners 408. For example, M combiners 408 are each configured to receive N sub-beams from N calibrators 407 associated with N antenna elements. In some examples, the sub-beams combined in one of the combiners 408 corresponds to antenna elements in a row of the phased array antenna 405. The combiners 408 are configured to combine the received spectral components corresponding to one dimension of the antenna into a single sub-beam.

The combiners 408 are each configured to output the combined spectral components to a group delay controlling unit 409. For example, M group delay controlling units 409 (i.e. $GDC_1, \ldots, GDC_M$) are each configured to receive an optical sub-beam from a respective combiner 408 and add a controllable time delay to the optical sub-beam. For example, $GDC_1$ is configured to add time delay $T_1$ to an optical sub-beam from the first combiner 408, and $GDC_M$ is configured to add time delay $T_M$ to an optical sub-beam from the Mth combiner 408.

Analagous to the first embodiment, the group delay controlling units 409 are arranged to add a controllable time delay to the received spectral components. In the apparatus 400, each group delay controlling unit 409 receives and handles only one wavelength of spectral component. The M group delay controlling units 409 may be considered as adding controllable delays to M spectral components. The delay is independently controllable in each group delay controlling unit 409. The added delays corresponds to control of the delay in one dimension of the antenna, e.g. controlling the relative delays between rows of the antenna. The different delays may be linearly related, or scaled, relative to each other. Thus, a same additional delay amount is added between group delay controlling units 409 corresponding to adjacent antenna elements 405 (e.g. in a column of the antenna). As such, the delays added by the group delay controlling units 409 along a dimension are linear (i.e. directly proportional to the position of the antenna element along the dimension).

The antenna elements within each row have the same delay added by the group delay controlling units 409. In this example, the group delay controlling units 409 may control a vertical or elevation (up-down) angle of the beamforming.

In this example, the M spectral components have the same wavelength, and so the different delays are added by M group delay controlling units 409. The M group delay controlling units 409 may be considered as having a similar function and construction to group delay controlling unit 211 which is configured to add the delay to M spectral components of different wavelengths.

The plurality of group delay controlling units 409 are arranged to output the delayed spectral components to a combiner 410. The combiner 410 is configured receive the optical sub-beams from the group delay controlling units 409 and combine them into a single optical beam.

The optical heterodyning device 411 is configured to receive the optical beam from the combiner 410 and generate a RF signal from the optical beam. The heterodyning generates a radio frequency corresponding in frequency to the signal RS, with beamforming carried out in the optical domain. Thus, the output RF signal is directed at a particular angle in each of the two dimensions of the phased array antenna.

In the second embodiments of the present disclosure, the laser light sources 301 and 401 provide an optical beam having only one spectral component which is used for beamforming. Therefore, a demultiplexer such as 106, 202 and a laser comb provided by the laser light sources 101 or 201 are not needed in the transmitting apparatus 300 or the receiving apparatus 400. Compared to the first embodiment, the second embodiment 301,401 utilizes more waveguides having different chromatic dispersions are present.

For example, a laser light source 301, 401 is tunable to control one dimension of a phased array antenna in combination with waveguides (e.g. 307, 406). For example, in the transmitting apparatus 300 or the receiving apparatus 400, M×N waveguides are needed and divided into M sets of N waveguides in which the M sets of N waveguides are identical to each other and each set of N waveguides have N different chromatic dispersions.

Further, since only one spectral component is employed, the requirement on linearity of chromatic dispersions of waveguides is reduced and the modulation is simplified. Although transmitting apparatuses and receiving apparatuses according to the present disclosure are illustrated independently above, the transmitting and receiving apparatuses may be integrated as a single apparatus, such as a transceiver.

For any example, the steering of the RF beam (in transmission and in reception) is controlled by tuning the laser comb (or single laser wavelength) and the wavelength-selective group delays. All the controls are conveniently located at the base station. The laser comb is tuned rigidly (i.e., the detuning between each laser in the comb is maintained during the tuning). This way, the cumulated delay of each wavelength across all the waveguides with scaled chromatic dispersion is linearly tuned, controlling the horizontal (or vertical) steering of the beam. Changing the group delay between the wavelengths, the vertical (or horizontal) steering of the beam is controlled. The group delay controls are broadband enough to accommodate the tuning of the lasers.

Figure 5:
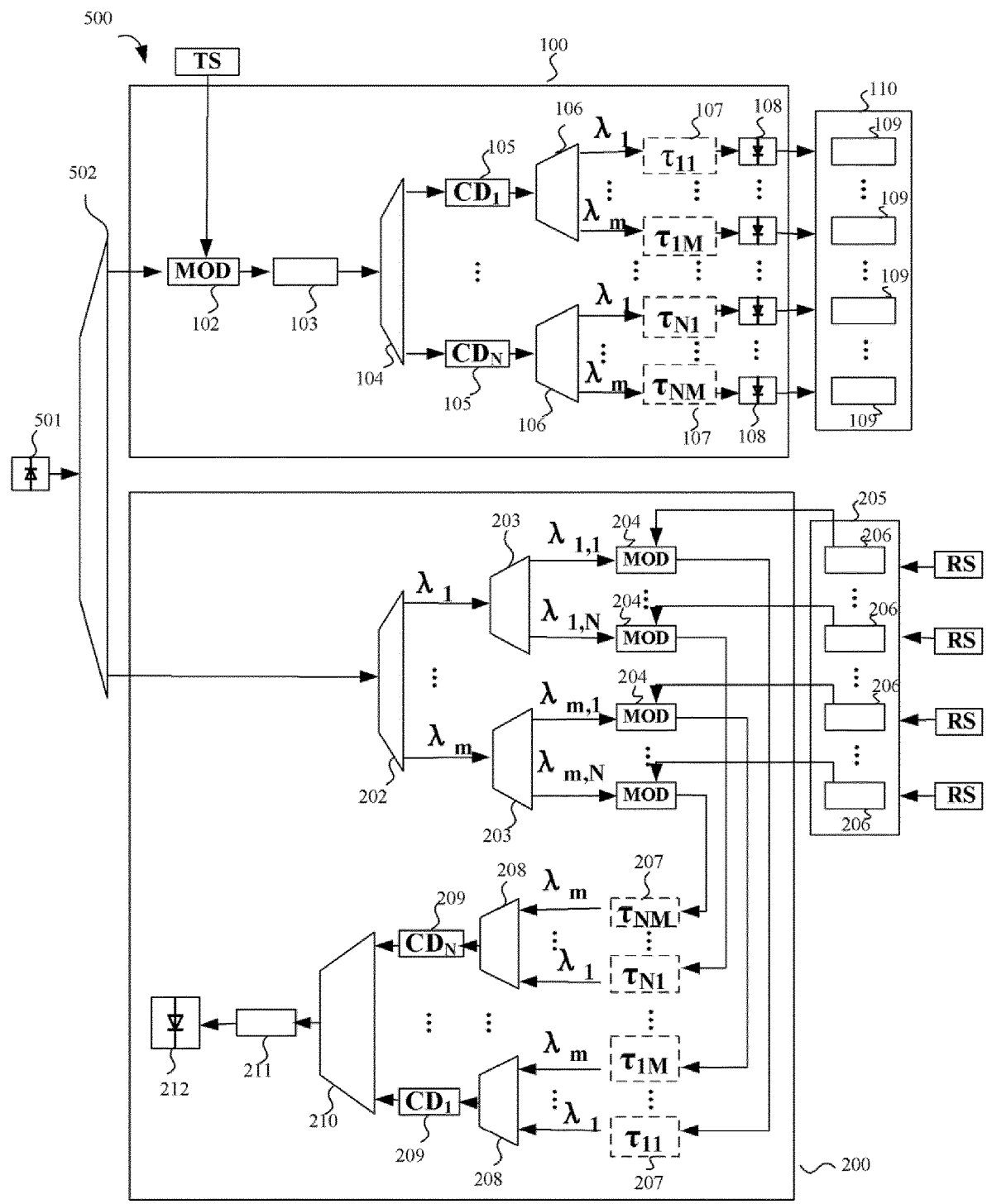
FIG. 5 is schematic illustration of a transceiver according to a first embodiment of the present disclosure.

FIG. 5 illustrates an example of such a transceiver 500 according to a first embodiment of the present disclosure. The transceiver 500 comprises a combination of the transmitting apparatus 100 and the receiving apparatus 200. Correspondingly labelled parts have the same arrangement and function as described above. In the transceiver 500, the laser light sources 101 and 201 are consolidated as a single laser light source 501. The laser light source 501 is configured to generate a plurality of spectral components of different wavelengths, as described above.

The transceiver 500 further comprises a splitter 502 configured to split the optical beam provided by the laser light source 501 into two parts, one for the transmitting apparatus 100 and one for the receiving apparatus 200. In the example, the transmitting apparatus 100 and the receiving apparatus 200 use the same one (i.e. common) laser light source. In this example, tuning of the laser light source will provide for corresponding beamforming in both transmission and receiving. In another example, the transceiver 500 can comprise an independent transmitting apparatus 100 and receiving apparatus 200. That is to say, the transmitting apparatus 100 and the receiving apparatus 200 have separate laser light sources (i.e. laser light sources 101 and 201) in the transceiver 600.

Figure 6:
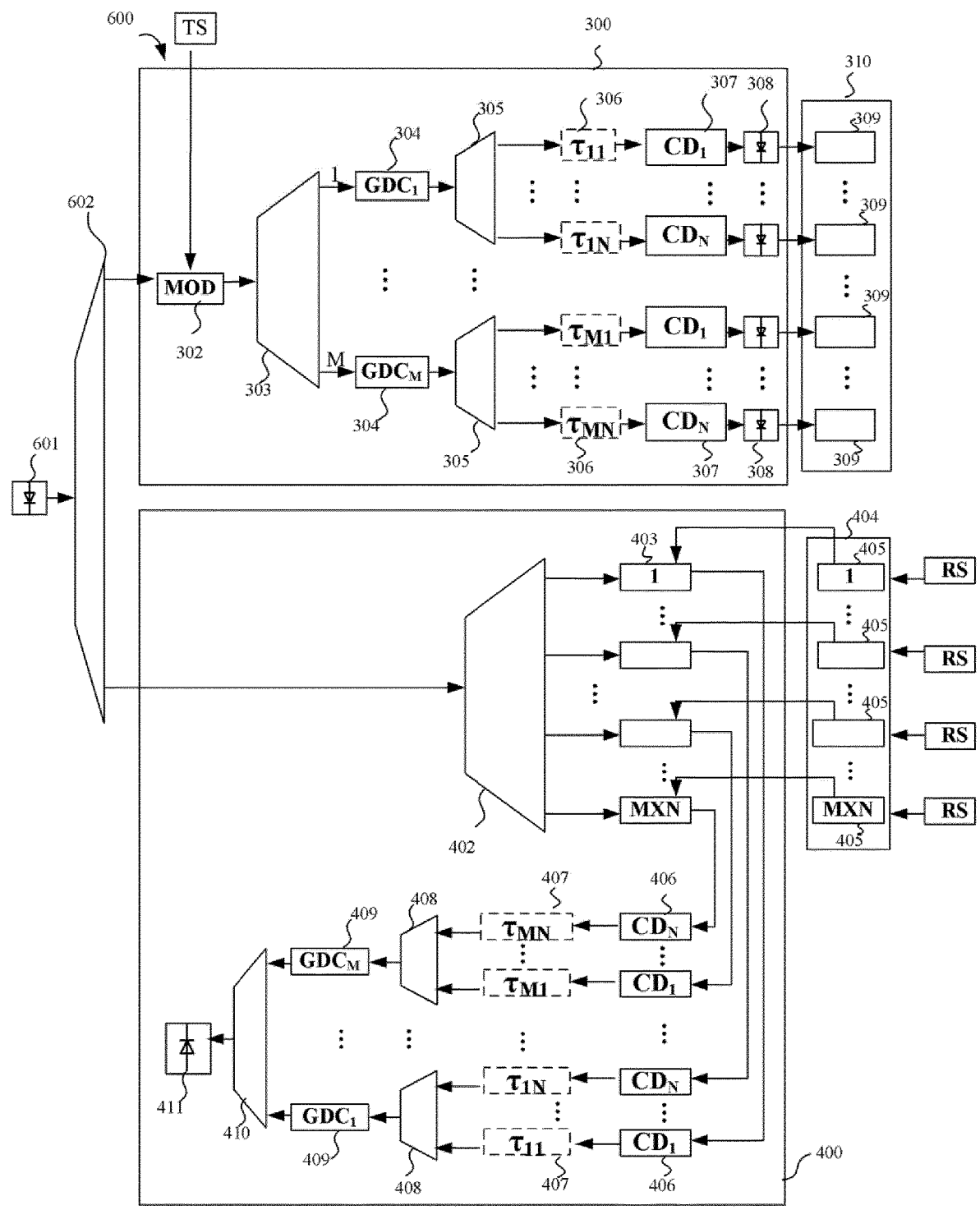
FIG. 6 is schematic illustration of a transceiver according to a second embodiment of the present disclosure.

FIG. 6 illustrates an example of a transceiver 600 according to a second embodiment of the present disclosure. The transceiver 600 comprises a combination of the transmitting apparatus 300 and the receiving apparatus 400. Correspondingly labelled parts have the same arrangement and function as described above. In the transceiver 600, the laser light sources 301 and 401 are consolidated as a single laser light source 601. The laser light source 601 is configured to generate a single spectral component used for transmission and receiving, as described above. As seen in FIG. 6, the transceiver 600 comprises only one laser light source 601 configured to provide an optical beam comprising one or more spectral components. In such a case, the transceiver 600 further comprises a splitter 602 configured to split the optical beam provided by the laser light source 601 into two parts, one for the transmitting apparatus 300 and the other for the receiving apparatus 400. In the example, the transmitting apparatus 300 and the receiving apparatus 400 use the same one (i.e. common) laser light source. In this example, tuning of the laser light source will provide for corresponding beamforming in both transmission and receiving.

In another example, the transceiver 600 may comprise an independent transmitting apparatus 300 and receiving apparatus 400 independently. In that case, the transmitting apparatus 300 and the receiving apparatus 400 have their respective laser light sources (i.e. laser light sources 301 and 401) in the transceiver 600.

In FIGS. 5 and 6, the phased array antennas 110, 205, 310 and 404 (including antenna elements 109, 206, 309 and 405 respectively), and other optical beamforming components, are illustrated by a way of example and are the same as those in FIGS. 1 to 4. Also, transmitting signals TS and receiving signals RS are illustrated by a way of example in FIGS. 5 and 6. Those skilled in the art can realize that the transmitting signals TS and receiving signals RS may be any RF signals.

Although waveguides of the transmitting apparatus and the receiving apparatus in the transceiver are shown as different parts in FIG. 5 or 6, those skilled in the art can realize that waveguides of the transmitting apparatus and the receiving apparatus can be the same part, i.e., one of the transmitting apparatus and the receiving apparatus can use the other part's waveguides.

The controllable time delays added by one or more group delay controlling units of a transmitting apparatus included in the transceiver 500,600 may correspond to or equal those added by one or more group delay controlling units of a receiving apparatus included in the same transceiver. This may provide for transmission and receiving in the same direction. Alternatively, the controllable time delays added by one or more group delay controlling units of the transmitting and receiving apparatus may be independently controlled. This allows for transmitting and receiving beamforming in different directions.

Figure 8:
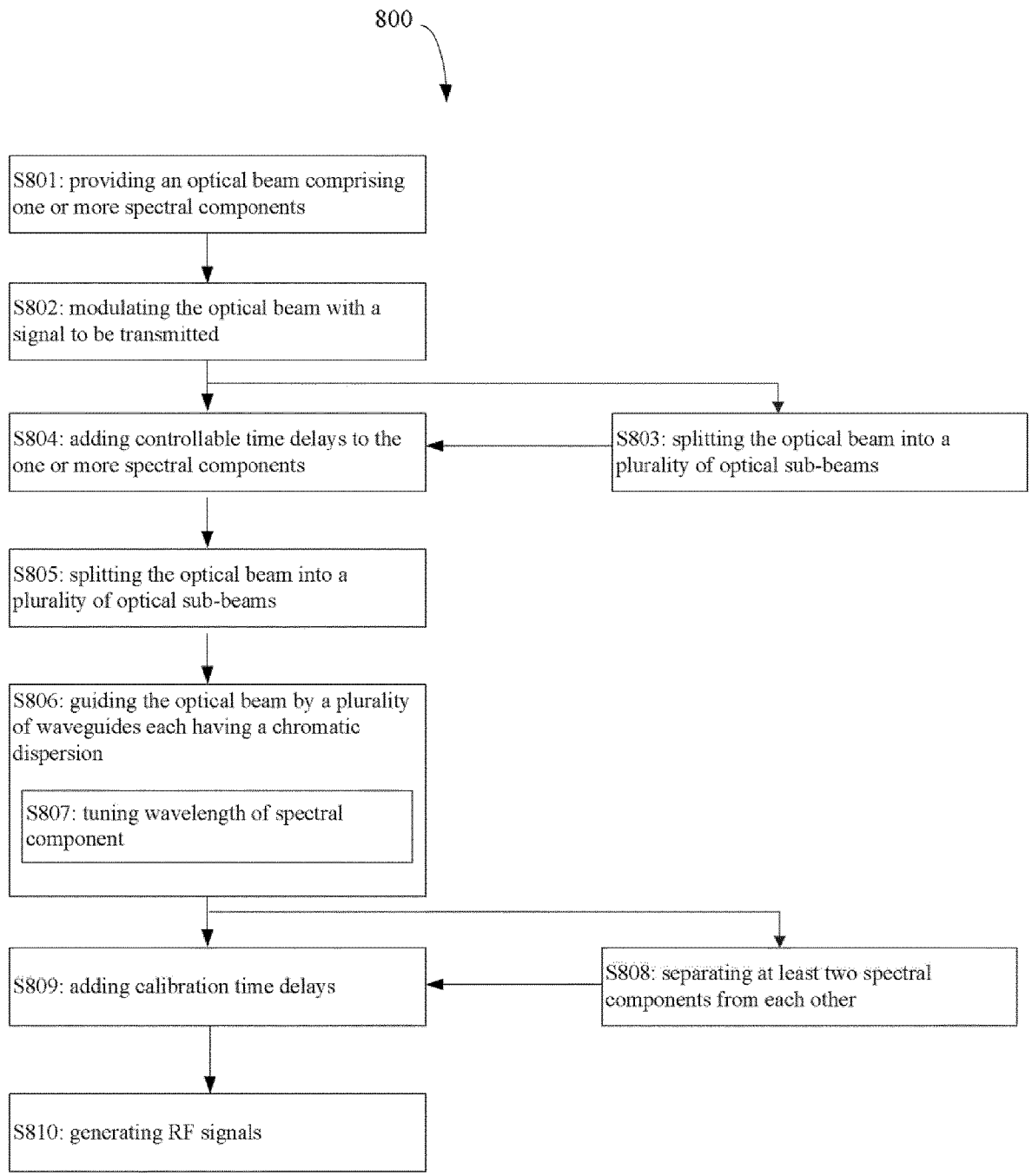
FIG. 8 illustrates a flow chart of a transmitting method for a phased array antenna according to an embodiment of the present disclosure.

FIG. 8 illustrates a flow chart of a transmitting method 800 for a phased array antenna according to an embodiment of the present disclosure. This method 800 is applicable to any embodiment of the transmitting apparatus, e.g. transmitting apparatus 100, 300, including as part of the transceiver 500,600.

At step 801, an optical beam comprising one or more spectral components is provided by a tunable laser light source. Wavelengths of the one or more spectral components can be tuned to control time delays added by a plurality of waveguides. The tuning of the laser light source provides for control of beamforming in one dimension. In some aspects, the one dimension corresponds to a dimension of the phased array antenna in which antenna elements transmit using the same group delay, e.g. using the same spectral component.

At step 802, the optical beam is modulated with a signal to be transmitted, such as by a modulator. The modulating comprises modulating the one or more spectral components with a signal to be transmitted (e.g. a RF signal), and can be implemented in various ways, such as by modulating wavelengths.

Step 803 is applicable to the second embodiment shown in FIGS. 3 and 6. The optical beam is split into a plurality of optical sub-beams. The number of sub-beams is based on the number of antenna elements in a dimension of the phased array antenna. The optical beam comprises one spectral component (including both modulated and non-modulated components) such that each sub-beam has the same optical component as the optical beam. If the optical beam comprises more than one spectral component, for example, as in the embodiments of FIGS. 1 and 5, this step 803 may be omitted, and the method 800 directly proceeds from step 802 to step 804.

At step 804, controllable time delays are added to the one or more spectral components in the modulated optical beam by one or more group delay controlling units. For example, the delay may be provided by one or more micro ring resonator. This step comprises adding a plurality of controllable time delays to a plurality of optical beams. The optical beams may have a common wavelength spectral component (as in FIG. 3 or 6) or which have an independent wavelength spectral component (as in FIG. 1 or 5). The added time delays can be adjusted to control beamforming in one dimension of the phased array antenna, and thus steering of a signal to be transmitted by the phased array antenna. The dimension controlled comprises antenna elements for which the group delay may be independently added. For example, the group delay may be independently added to different wavelengths to generate the RF signal (as in FIG. 1), or using separate group delay controlling units (FIG. 3). In the example, this provides for control in the up-down direction.

At step 805, the optical beam is further split into a plurality of optical sub-beams based on the number of antenna elements of the phased array antenna or the number of antenna elements in a dimension of the phased array antenna. For example, this is carried out by splitter 106 or splitter 305.

At step 806, the optical sub-beams are guided by a plurality of waveguides each having a defined chromatic dispersion. In an embodiment, the guiding comprises guiding the optical beam to the phased array antenna, i.e. making the optical beam to pass through the waveguides and thus causing time delays to be applied to the one or more spectral components by the waveguides.

Step 807 comprises controlling of the time delays added by the waveguides by tuning wavelengths of the one or more spectral components provided by the laser light source. This provides for control of the other dimension of the phase array antenna to that controlled by the group delay controlling unit(s).

Step 808 is applicable to the first embodiment of FIGS. 1 and 5. The optical beam comprising a plurality of spectral components (i.e. comprising spectral components originating from different spectral components of the laser light source) may be demultiplexed. The demultiplexing may be performed in which the at least two spectral components are demultiplexed or separated from each other, such that each resultant optical sub-beam comprises only one of the at least two spectral components. Otherwise, e.g. for the embodiment of FIGS. 3 and 6, the method 800 directly proceeds to step 809 from step 806 without performing step 808.

At step 809, calibration time delays are added to the one or more spectral components by a calibrator 107, 306. The calibration time delay is based on nominal wavelengths of the one or more spectral components and chromatic dispersions of the waveguides. As described above, the added calibration time delay is different for each waveguide and spectral component. In an embodiment, the step can be omitted or carried out at a different point in the method.

At step 810, each optical heterodyning device receives a respective optical beam including a calibration time delay from a calibrator or a waveguide and generates a RF signal from the respective optical beam which can then be transmitted via a respective one of the antenna elements of the phased array antenna. The direction of the transmission is controlled independently by tuning the laser light source and controlling the group delay of the modulated spectral components, e.g. in fast micro-ring resonators.

Figure 9:
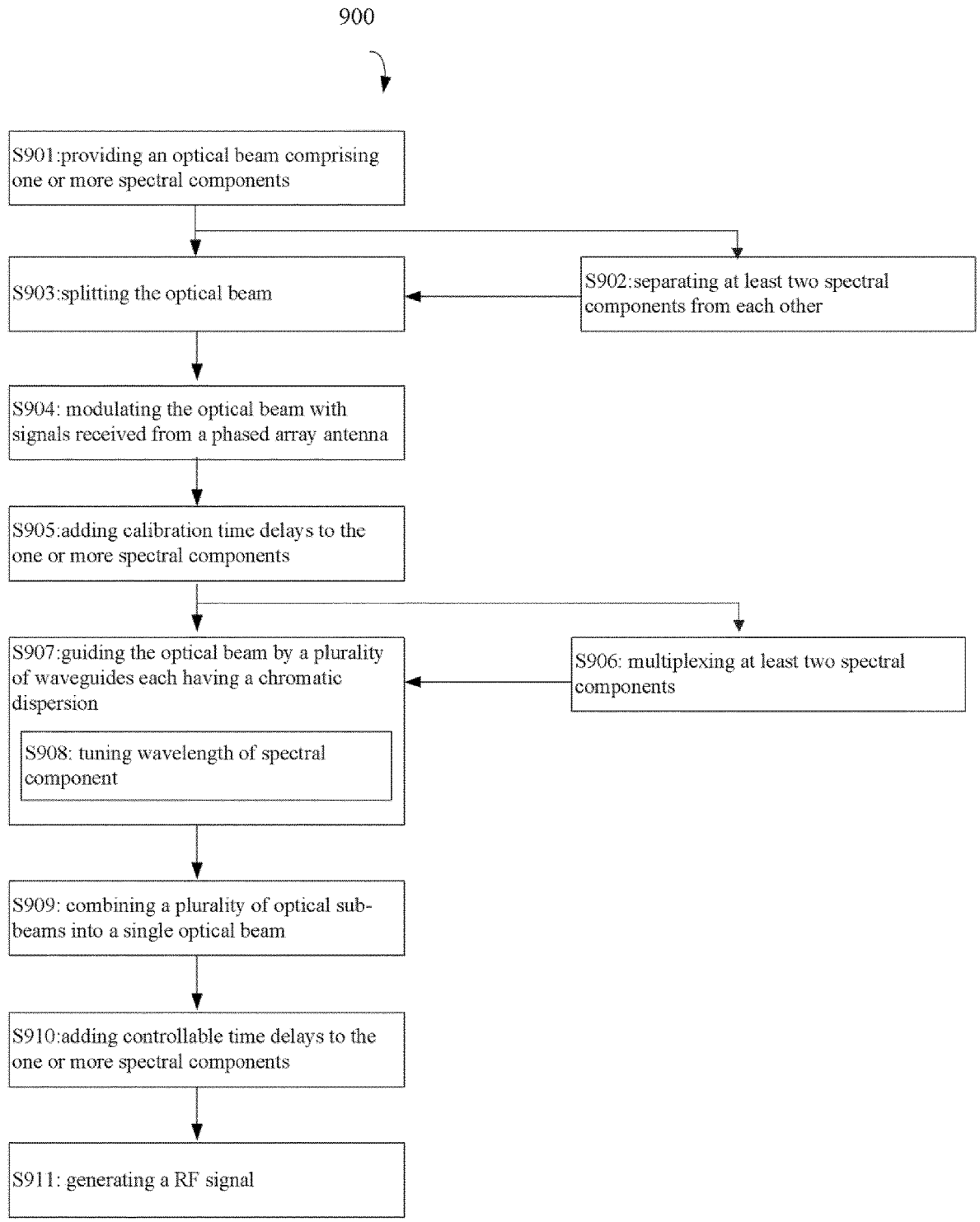
FIG. 9 illustrates a flow chart of a receiving method for a phased array antenna according to an embodiment of the present disclosure.

FIG. 9 illustrates a flow chart of a receiving method 900 for a phased array antenna according to an embodiment of the present disclosure. The method 900 is applicable to any embodiment of the receiving apparatus, e.g. receiving apparatus 200, 400, including as part of the transceiver 500,600.

At step 901, an optical beam comprising one or more spectral components is provided by a tunable laser light source. As describe above, one dimension of the phase array antenna can be controlled by tuning the laser light source in combination with a plurality of waveguides each having a chromatic dispersion. In particular, the wavelengths of the one or more spectral components of the laser light source are tunable to control time delays added by the plurality of waveguides, thus enabling control for one dimension of the phased array antenna.

At step 902, if the optical beam comprises at least two spectral components, then the at least two spectral components are separated from each other, i.e. demultiplexed. Each of the resultant optical sub-beams has one of the at least two original spectral component. This step is applicable to the embodiments of FIGS. 2 and 5. For the embodiment of FIGS. 4 and 6, this step can be omitted and the method 900 proceeds to step 903 from step 901.

At step 903, the received optical beam is split into a plurality of optical sub-beams. The number of sub-beams is based on (e.g. the same as) the number of antenna elements of the phased array antenna. The optical sub-beam all comprise the same optical component as the input optical beam. The splitting generates multiple copies of the input beam.

At step 904, the plurality of optical sub-beams are each modulated with signals received from the phased array antenna, e.g. by a plurality of modulators. This step may comprise modulating each of the plurality of spectral components with a respective received RF signal. The resultant signal comprises spectral components which are both modulated and unmodulated.

At step 905, calibration time delays are added to the one or more spectral components by a calibrator. The calibration delays are based on nominal wavelengths of the one or more spectral components and chromatic dispersions of the waveguides. As described above, the added calibration time delay is different for each waveguide and spectral component.

At step 906, if the optical beam provided by the laser light source comprises at least two spectral components, at least two spectral components in different optical sub-beams are multiplexed. This is described with reference to FIG. 2. The multiplexing (e.g. by multiplexers 208) provides a resultant optical beam comprising at least two spectral components of different wavelengths. For the embodiments of FIGS. 4 and 6, this step can be omitted and the method 900 may proceed to step 907 from step 905.

At step 907, the optical beam or the optical sub-beams are guided by a plurality of waveguides each having a chromatic dispersion. The chromatic dispersions of the plurality of waveguides is different, e.g. scaled. Step 908 may comprise tuning the wavelength(s) of the one or more spectral components provided by the laser light source to control the time delays added by the waveguides, in order to control one dimension of the phased array antenna. The same change in wavelength provides a different time delay when the spectral component(s) passes through different waveguides having different chromatic dispersion values.

At step 909, a plurality of optical beams or sub-beams are combined. The number of sub-beams combined may be based on (e.g. same as) the number of antenna elements of the phased array antenna or the number of antenna elements in a dimension of the phased array antenna as described with reference to FIGS. 2 and 4.

At step 910, controllable time delays are added to the one or more spectral components in the combined optical beam by one or more group delay controlling units. These time delays can be adjusted to control other dimension of the phased array antenna as described above. A separate time delay is added to each spectral component, either at different wavelengths (using unit 211 in FIG. 2) or using different group delay controlling units (units 409 in FIG. 4). For the example of FIG. 4, the plurality of spectral components from the group delay controlling units 409 are combined, e.g. in combined 410.

At step 911, an optical heterodyning device receives the optical beam and generates a RF signal from the optical beam. For example, the heterodyning is carried out using a photodiode, as described for heterodyning device 411.

Those skilled in the art can realize that some of the steps of methods 800 and 900 can be performed multiple times if needed. Although the methods 800 and 900 are illustrated in a particular order, those skilled in the art can realize that they can be implemented in any other order without departing from the scope of the present disclosure. Also, some steps can be omitted or combined into a single step. Alternatively, one step can also be divided into a plurality of steps.

According to the disclosure, the subject matter can be implemented in a computer program product configured, when run on a computer, to carry out all the steps of any one of the above-mentioned methods.

In the above, a wavelength of a spectral component is described as being tunable to control a time delay added by a waveguide (i.e. a beam direction of a phased array antenna in one dimension). However, those skilled in the art can realize that other parameters (e.g., a frequency) of a spectral component may alternatively be considered as controlled.

It will be appreciated that the disclosure can be implemented in any suitable form including hardware, software, firmware or any combination of these. The elements and components of an embodiment of the disclosure may be physically, functionally and logically implemented in any suitable way.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely for clarifying examples and shall not be construed as limiting the scopes of the claims in any way.

An aspect of the disclosure may be considered as providing an apparatus for a phased array antenna configured to transmit a signal. The apparatus comprising a laser light source configured to provide an optical beam comprising one or more spectral components; and a modulator configured to modulate the optical beam with the signal to be transmitted. The apparatus further comprises one or more group delay controlling units configured to add one or more controllable time delays to the one or more spectral components; and a plurality of waveguides each having a chromatic dispersion configured to guide the optical beam. In some examples the laser light source is tunable to control time delays added by the plurality of waveguides. In some aspects, the apparatus is configured such that a beamforming of the signal to be transmitted is controllable by the one or more group delay controlling units and by a tuning of the laser light source.

A further aspect of the disclosure may be considered as providing apparatus for a phased array antenna configured to receive a signal. The apparatus comprising a laser light source configured to provide an optical beam comprising one or more spectral components; and a plurality of modulators configured to modulate the optical beam with the signal received from the phased array antenna. The apparatus further comprising a plurality of waveguides each having a chromatic dispersion configured to guide the optical beam; and one or more group delay controlling units configured to add one or more controllable time delays to the one or more spectral components. The laser light source is tunable to control time delays added by the plurality of waveguides. In some aspects, the apparatus is configured such that a beamforming of the signal received is controllable by the one or more group delay controlling units and by a tuning of the laser light source.

The described examples of the first and second type of control mechanism may be used together in any combination or embodiment, or only one of the described examples (e.g. tuning of wavelengths, group delay) may be used with any other optical delay control mechanism.

The transmitting apparatus, receiving apparatus or transceiver described of any embodiment may be considered as an apparatus forming part of a base station, e.g. in a radio access network. The base station provides for radio frequency communication over an air interface with one or wireless devices, e.g. user equipment, wireless terminal, or mobile telephone. The RF signal may correspond to any radio access technology, e.g. Long Term Evolution (LTE) or a 5G communication. The optical beamforming may be suitable for high frequency (e.g. millimeter wavelength) radio communication. Aspects of the disclosure may be considered as being a base station or radio unit configured to transmit and/or receive, or a device forming a part of a base station or radio unit configured to transmit and/or receive. In some aspects, the arrangements described may be considered as an optical beamforming network for a two dimensional phased array antenna.

The chromatic dispersions have been described as introduced by a waveguide. Alternatively, any component or element may be used to introduce a delay having a chromatic dispersion. The delay may be considered as implemented by a chromatic dispersion unit.

The laser light source may be one or more lasers, or may be a port for receiving laser light generated by an external one or more laser.

References to the particular direction of beamforming (e.g. vertically, horizontally, up-down, left-right) are examples only. The antenna may be mounted at any angle, and such references are for example. The different beamforming control types used (i.e. wavelength tuning and group delay control) may be used to control any dimension of the antenna, and are not limited to the examples shown. The antenna is not required to be a square grid, and the antenna elements may be arranged in any suitable positions. The two dimensions of the antenna may be orthogonal, or may be non-orthogonal.

The invention claimed is:

1. An apparatus for a phased array antenna configured to transmit a signal, the apparatus comprising:
a laser light source configured to provide an optical beam comprising one or more spectral components;
a modulator configured to modulate the optical beam with the signal to be transmitted;
a first type of control mechanism to control a delay of the signal to be transmitted using the one or more spectral components, the first type of control mechanism comprising one or more group delay controlling units configured to add one or more controllable time delays to the one or more spectral components to independently control beamforming in a first dimension; and
a second type of control mechanism to control a delay of the signal to be transmitted using the one or more spectral components, the second type of control mechanism comprising a plurality of waveguides each having a different chromatic dispersion configured to add a different additional controllable delay to each of the one or more spectral components to independently control beamforming in a second dimension;
wherein the apparatus is configured such that a beamforming of the signal to be transmitted is controllable by the first and second type of control mechanism.

2. An apparatus for a phased array antenna configured to receive a signal, the apparatus comprising:
a laser light source configured to provide an optical beam comprising one or more spectral components;
a plurality of modulators configured to modulate the optical beam with the signal received from the phased array antenna;
a first type of control mechanism to control a delay of the received signal using the one or more spectral components, the first type of control mechanism comprising one or more group delay controlling units configured to add one or more controllable time delays to the one or more spectral components to independently control beamforming in a first dimension; and
a second type of control mechanism to control a delay of the received signal using the one or more spectral components, the second type of control mechanism comprising a plurality of waveguides each having a different chromatic dispersion configured to add a different additional controllable delay to each of the one or more spectral components to independently control beamforming in a second dimension;
wherein the apparatus is configured such that a beamforming of the received signal is controllable by the first and second type of control mechanism.

3. The apparatus as claimed in claim 1, wherein the phased array antenna is a two-dimensional phased array antenna and, the first type of control mechanism is configured to control beamforming in a first dimension of the two-dimensional phased array antenna, and the second type of control mechanism is configured to control beamforming in a second dimension of the two-dimensional phased array antenna.

4. The apparatus as claimed in claim 2, wherein:

the laser light source is tunable to control time delays added by the plurality of waveguides; and the apparatus is configured such that the beamforming of the received signal is controllable by the one or more group delay controlling units and by a tuning of the laser light source.

5. The apparatus as claimed in claim 4 wherein the one or more group delay controlling units comprise one or more micro-ring resonator.

6. The apparatus as claimed in claim 4, further comprising a calibrator configured to add a calibration time delay to each spectral component based on a nominal wavelength of the spectral component and a chromatic dispersion of a corresponding one of the plurality of waveguides.

7. The apparatus as claimed in claim 4, wherein chromatic dispersions of the plurality of waveguides have a linear relationship with each other.

8. The apparatus as claimed in claim 2, further comprising one or more splitter and/or demultiplexer configured to split the optical beam into a plurality of sub-beams based on the number of antenna elements of the phased array antenna or the number of antenna elements in a dimension of the phased array antenna.

9. The apparatus as claimed in claim 2, wherein the first type of control mechanism is arranged to apply a delay to each of the spectral components in a same optical beam, or the first type of control mechanism is arranged to apply a delay separately to each of the spectral components in an optical sub-beam split from the optical beam.

10. The apparatus as claimed in claim 2, wherein the second type of control mechanism is arranged to apply a delay to each of the spectral components in a same optical beam, or the second type of control mechanism is arranged to apply a delay separately to each of the spectral components in an optical sub-beam split or demultiplexed from the optical beam.

11. A transceiver comprising the apparatus configured to transmit a signal as claimed in claim 1 and a receiver apparatus for a phased array antenna configured to receive a signal comprising:

a laser light source configured to provide an optical beam comprising one or more spectral components;

a plurality of modulators configured to modulate the optical beam with the signal received from the phased array antenna;

a first type of control mechanism to control a delay of the received signal using the one or more spectral components, the first type of control mechanism comprising one or more group delay controlling units configured to add one or more controllable time delays to the one or more spectral components to independently control beamforming in a first dimension; and a second type of control mechanism to control a delay of the received signal using the one or more spectral components, the second type of control mechanism comprising a plurality of waveguides each having a different chromatic dispersion configured to add a different additional controllable delay to each of the one or more spectral components to independently control beamforming in a second dimension;

wherein the receiver apparatus is configured such that a beamforming of the received signal is controllable by the first and second type of control mechanism.

12. The transceiver as claimed in claim 11, wherein the apparatus configured to transmit a signal and the receiver apparatus configured to receive a signal share the same laser light source, the laser light source comprising a tunable laser light source, and wherein the transceiver further comprises a splitter configured to split an optical beam provided by the tunable laser light source into two optical sub-beams, such that the two optical sub-beams are directed to the apparatus configured to transmit a signal and the apparatus configured to receive a signal.

13. A method of transmitting a signal for a phased array antenna, comprising:

providing a laser light source configured to provide an optical beam comprising one or more spectral components;

modulating the optical beam with the signal to be transmitted;

controlling a delay of the signal to be transmitted using a first type of control mechanism on the one or more spectral components, the first type of control mechanism comprising one or more group delay controlling units configured to add one or more controllable time delays to the one or more spectral components to independently control beamforming in a first dimension;

controlling a delay of the signal to be transmitted using a second type of control mechanism on the one or more spectral components, the second type of control mechanism comprising a plurality of waveguides each having a different chromatic dispersion configured to add a different additional controllable delay to each of the one or more spectral components to independently control beamforming in a second dimension; and controlling beamforming of the signal to be transmitted using the first and second type of control mechanism.

14. A method of receiving a signal for a phased array antenna, comprising:

providing a laser light source configured to provide an optical beam comprising one or more spectral components;

modulating the optical beam with the received signal;

controlling a delay of the received signal using a first type of control mechanism on the one or more spectral components, the first type of control mechanism comprising one or more group delay controlling units configured to add one or more controllable time delays to the one or more spectral components to independently control beamforming in a first dimension;

controlling a delay of the received signal using a second type of control mechanism on the one or more spectral components, the second type of control mechanism comprising a plurality of waveguides each having a different chromatic dispersion configured to add a different additional controllable delay to each of the one or more spectral components to independently control beamforming in a second dimension; and controlling beamforming of the received signal using the first and second type of control mechanism.

15. The method as claimed in claim 13, wherein the phased array antenna is a two-dimensional phased array antenna and, the first type of control mechanism controls beamforming in one dimension of the two-dimensional phased array antenna, and the second type of control mechanism controls beamforming in the other dimension of the two-dimensional phased array antenna.

16. The method as claimed in claim 13, wherein:
the laser light source is tunable to control time delays added by the plurality of waveguides; and
controlling beamforming of the signal to be transmitted comprises using the one or more group delay controlling units and tuning of the laser light source.

17. A computer program product, the computer program product comprising a non-transitory computer-readable storage medium, the non-transitory computer-readable storage medium comprising a computer program comprising computer-executable instructions which, when executed on a processor, are configured to carry out a method of transmitting a signal for a phased array antenna, the method comprising:
   modulating an optical beam with the signal to be transmitted, the optical beam comprising one or more spectral components;
   controlling a delay of the signal to be transmitted using a first type of control mechanism on the one or more spectral components, the first type of control mechanism comprising one or more group delay controlling units configured to add one or more controllable time delays to the one or more spectral components to independently control beamforming in a first dimension;
   controlling a delay of the signal to be transmitted using a second type of control mechanism on the one or more spectral components, the second type of control mechanism comprising a plurality of waveguides each having a different chromatic dispersion configured to add a different additional controllable delay to each of the one or more spectral components to independently control beamforming in a second dimension; and
   controlling beamforming of the signal to be transmitted using the first and second type of control mechanism.

* * * * *